United States Patent
Long et al.

(10) Patent No.: US 11,836,335 B2
(45) Date of Patent: Dec. 5, 2023

(54) METHOD AND APPARATUS FOR ADJUSTING POSITION OF VIRTUAL BUTTON, DEVICE, STORAGE MEDIUM, AND PROGRAM PRODUCT

(71) Applicant: Tencent Technology (Shenzhen) Company Limited, Shenzhen (CN)

(72) Inventors: Yuqi Long, Shenzhen (CN); Shuting Zhang, Shenzhen (CN); Shuai Han, Shenzhen (CN); Meng Qiu, Shenzhen (CN); Jianquan Li, Shenzhen (CN); Qiwen Zheng, Shenzhen (CN); Ruci Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/546,957

(22) Filed: Dec. 9, 2021

(65) Prior Publication Data

US 2022/0137800 A1 May 5, 2022

Related U.S. Application Data

(63) Continuation of application No. PCT/CN2021/115808, filed on Aug. 31, 2021.

(30) Foreign Application Priority Data

Oct. 30, 2020 (CN) .......................... 202011190860.8

(51) Int. Cl.
*G06F 3/048* (2013.01)
*G06F 3/04845* (2022.01)
(Continued)

(52) U.S. Cl.
CPC ...... *G06F 3/04845* (2013.01); *G06F 3/04842* (2013.01); *G06F 3/04886* (2013.01); *A63F 13/533* (2014.09); *A63F 2300/308* (2013.01)

(58) Field of Classification Search
CPC ............. G06F 3/04845; G06F 3/04842; G06F 3/04886; A63F 13/533; A63F 2300/308
See application file for complete search history.

(56) References Cited

U.S. PATENT DOCUMENTS 9,772,743 B1 * 9/2017 Mueller .............. G06F 3/04886
2014/0304631 A1 10/2014 Wang et al.
(Continued)

FOREIGN PATENT DOCUMENTS

| CN | 104536641 A | 4/2015 |
| CN | 104808943 A | 7/2015 |

(Continued)

OTHER PUBLICATIONS

Extended European Search Report for EP Application No. 21782632.0 dated Sep. 8, 2022 (10 pages).

(Continued)

*Primary Examiner* — Rashawn N Tillery
(74) *Attorney, Agent, or Firm* — Crowell & Moring LLP

(57) ABSTRACT

A method for adjusting the position of a virtual button includes: presenting a button adjustment interface of a virtual scene including a target virtual button; controlling, in response to a movement operation for the target virtual button, the target virtual button to move in the button adjustment interface, to adjust a presentation position of the target virtual button in the virtual scene, wherein at least two presentation forms of the target virtual button are in the virtual scene; and presenting prompt information in response to the target virtual button being moved to a boundary area in the button adjustment interface, the prompt information (Continued)

being used for prompting that the target virtual button is displayed abnormally in the virtual scene when the target virtual button is in a target presentation form of the at least two presentation forms.

20 Claims, 15 Drawing Sheets

(51) Int. Cl.
*G06F 3/04886* (2022.01)
*G06F 3/04842* (2022.01)
*A63F 13/533* (2014.01)

(56) References Cited

U.S. PATENT DOCUMENTS

2015/0378459 A1    12/2015  Sawada
2017/0003837 A1*    1/2017  Shamonsky ........ G06F 3/04886
2019/0091561 A1     3/2019  Li
2020/0316469 A1*   10/2020  Lei ....................... A63F 13/426

FOREIGN PATENT DOCUMENTS

| | | | |
|---|---|---|---|
| CN | 105027064 A | 11/2015 | |
| CN | 105498213 B | 2/2017 | |
| CN | 106959812 A | 7/2017 | |
| CN | 109799941 A | 5/2019 | |
| CN | 110456907 A | 11/2019 | |
| CN | 112306351 A | 2/2021 | |
| CN | 112416196 A * | 2/2021 | ............. A63F 13/52 |
| CN | 112569611 A * | 3/2021 | ............. A63F 13/52 |
| EP | 2 985 685 A1 | 2/2016 | |
| EP | 2985685 A1 * | 2/2016 | ............. G06F 3/048 |
| JP | 6042502 B2 | 11/2016 | |
| KR | 10-2015-0079862 | 7/2015 | |
| TW | 201319915 A | 5/2013 | |
| TW | M562430 | 6/2018 | |

OTHER PUBLICATIONS

International Search Report and Written Opinion for PCT/CN2021/115808 dated Nov. 16, 2021 including English translation of International Search Report (12 pages).
Singapore Written Opinion and Search Report for Application No. 11202111513S dated Apr. 17, 2023 (10 pages).
Office Action issued in Korean application 10-2021-7034607 dated May 30, 2023, and translation, 12 pages.

* cited by examiner

METHOD AND APPARATUS FOR ADJUSTING POSITION OF VIRTUAL BUTTON, DEVICE, STORAGE MEDIUM, AND PROGRAM PRODUCT

RELATED APPLICATION

This application is a continuation of International Patent Application No. PCT/CN2021/115808, filed Aug. 31, 2021, which claims the benefit of priority of Chinese Patent Application No. 202011190860.8, filed Oct. 30, 2020. The contents of International Patent Application No. PCT/CN2021/115808 and Chinese Patent Application No. 202011190860.8 are each incorporated herein by reference in their entirety.

FIELD OF THE TECHNOLOGY

This application relates to the field of computer technologies, and in particular, to a method and an apparatus for adjusting the position of a virtual button, a device, a computer-readable storage medium, and a computer program product.

BACKGROUND OF THE DISCLOSURE

A display technology based on graphics processing hardware expands channels for perceiving an environment and acquiring information. Especially, a display technology of virtual scenes can implement, according to actual application requirements, diversified interactions between virtual objects controlled by a user or artificial intelligence, and has various typical application scenarios, for example, virtual scenes such as military exercise simulation and gaming, to simulate a real battle process between virtual objects.

A user usually needs to control a virtual object or a virtual item in a virtual scene by using virtual buttons. To make the positions of the virtual buttons better satisfy operation habits of the user, a method is provided in the related art to customize a presentation position of a button in the virtual scene. However, when the virtual buttons have a plurality of presentation forms, if one set of custom button position settings is added for every presentation form, upload and download traffic is increased, resulting in a waste of storage space.

SUMMARY

Embodiments of this application provide a method and an apparatus for adjusting the position of a virtual button, a device, a computer-readable storage medium, and a computer program product, which can reduce memory consumption during data processing and save data storage space.

The technical solutions in the embodiments of this application are implemented as follows:

An embodiment of this application provides a method for adjusting the position of a virtual button, including:
  presenting a button adjustment interface of a virtual scene including a target virtual button;
  controlling, in response to a movement operation for the target virtual button, the target virtual button to move in the button adjustment interface, to adjust a presentation position of the target virtual button in the virtual scene, there being at least two presentation forms of the target virtual button in the virtual scene; and
  presenting prompt information in response to the target virtual button being moved to a boundary area in the button adjustment interface, the prompt information being used for prompting that the target virtual button is displayed abnormally in the virtual scene when the target virtual button is in a target presentation form of the at least two presentation forms.

An embodiment of this application provides an apparatus for adjusting the position of a virtual button, including:
  a presentation module, configured to present a button adjustment interface of a virtual scene including a target virtual button;
  a movement module, configured to control, in response to a movement operation for the target virtual button, the target virtual button to move in the button adjustment interface, to adjust a presentation position of the target virtual button in the virtual scene, there being at least two presentation forms of the target virtual button in the virtual scene; and
  a prompt module, configured to present prompt information in response to the target virtual button being moved to a boundary area in the button adjustment interface, the prompt information being used for prompting that the target virtual button is displayed abnormally in the virtual scene when the target virtual button is in a target presentation form of the at least two presentation forms.

An embodiment of this application provides a computer device, including:
  a memory, configured to store executable instructions; and
  a processor, configured to implement the method for adjusting the position of a virtual button according to the embodiments of this application when executing the executable instructions stored in the memory.

An embodiment of this application provides a computer-readable storage medium, storing executable instructions, and configured to, when executed by a processor, implement the method for adjusting the position of a virtual button according to the embodiments of this application.

An embodiment of this application provides a computer program product, including a computer program or instruction that, when executed by a processor, implements the method for adjusting the position of a virtual button provided in the embodiments of this application.

Embodiments of this application have the following beneficial effects:

The embodiments of this application are applied, so that presentation positions of a target virtual button in at least two presentation forms can be adjusted, and it is prompted that the target virtual button is displayed abnormally in a target presentation form in response to the target virtual button being moved to a boundary area, for a user to continue to adjust the presentation position of the target virtual button based on prompt information, so that various presentation forms of the target virtual button can be displayed normally in a virtual scene, thereby avoiding the problem of abnormal display of the target virtual button. In addition, a plurality presentation forms of the target virtual button share one presentation position, thereby improving the efficiency of data processing and saving storage space compared with the setting of a plurality of sets of button positions.

DESCRIPTION OF EMBODIMENTS

Figure 1A:
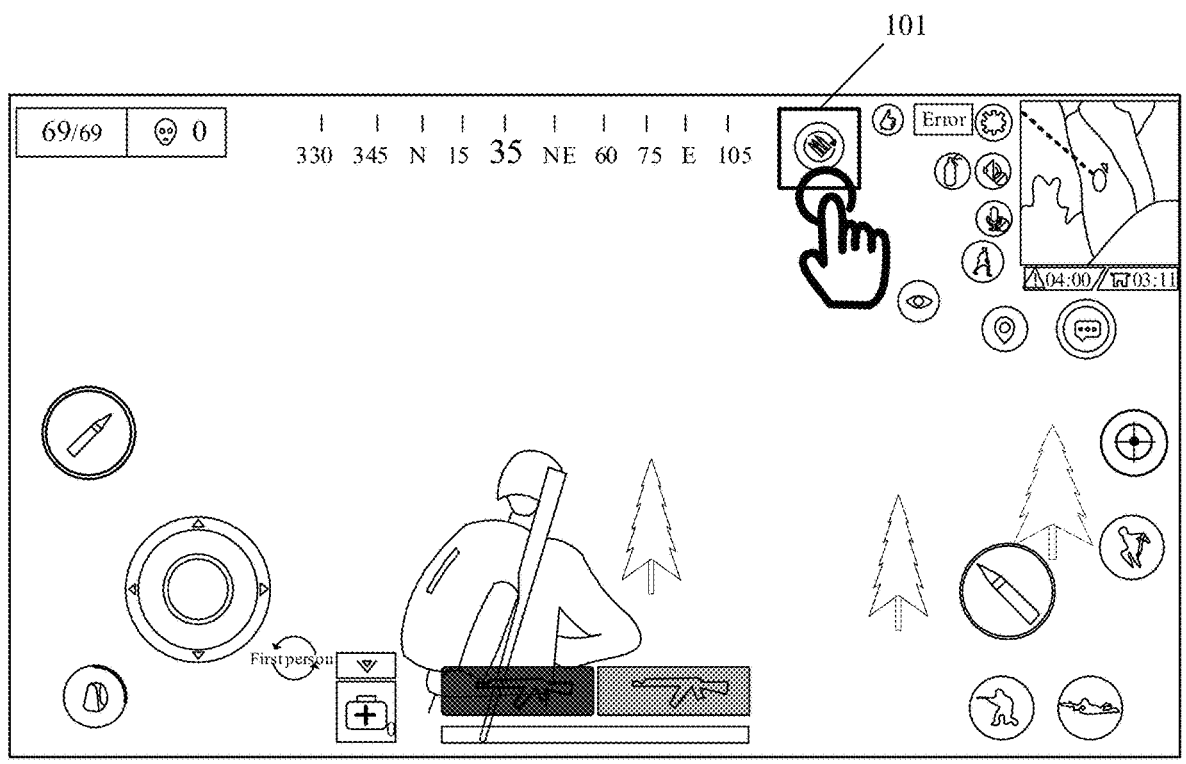
FIG. 1A and FIG. 1B are schematic diagrams of a presentation interface of a virtual button according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) A client is an application running on a terminal to provide various services such as a video playback client, a game client or the like.

2) "In response to" is used for indicating a condition or state on which an operation to be performed depends. In event that the condition or state on which the operation depends is met, one or more operations to be performed may be performed in real time or performed after a set delay. Unless otherwise specified, the order of performing a plurality of operations to be performed is not limited.

3) A virtual scene is displayed (or provided) in event that an application is running on a terminal. The virtual scene may be a simulated environment of a real world, or may be a semi-simulated and semi-fictional environment, or may be a completely fictional environment. The virtual scene may be any one of a two-dimensional virtual scene, a 2.5-dimensional virtual scene or a three-dimensional virtual scene. The dimensions of the virtual scene are not limited in the embodiments of this application. For example, the virtual scenes may include sky, land, sea, and the like. The land may include environmental elements such as a desert and a city. A user may control a virtual object to move in the virtual scene.

In a virtual scene, the same virtual button may have different presentation forms and sizes. In the process of implementing the embodiments of this application, the inventor finds that if the same set of custom button position settings are used, the virtual button may have a problem of being displayed incompletely in some presentation forms.

Figure 1B:
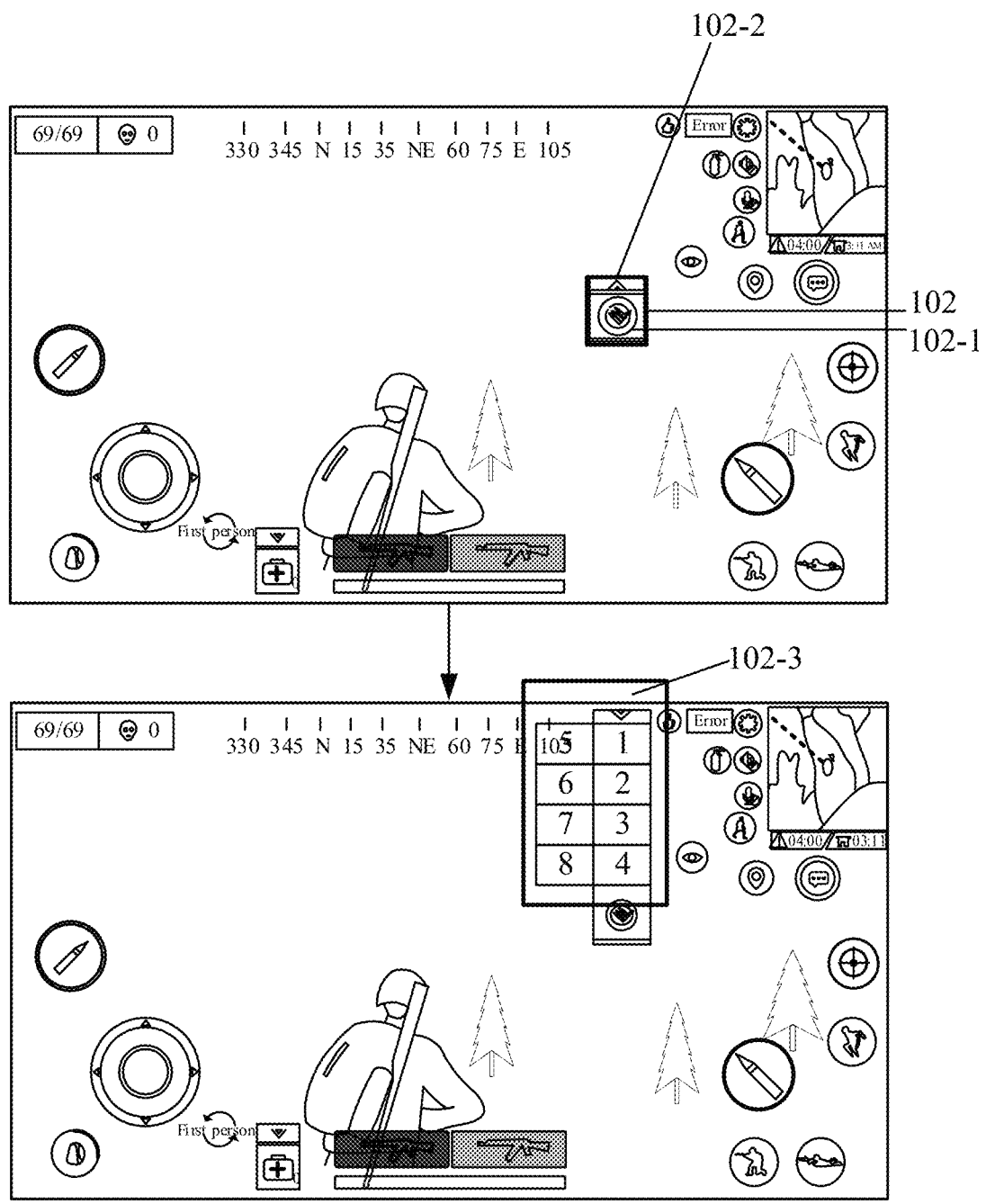

For example, FIG. 1A and FIG. 1B are schematic diagrams of a presentation interface of a virtual button according to an embodiment of this application. Referring to FIG. 1A, in a first mode, each gun can only be loaded with one type of bullets, and the corresponding bullets have only one grade. Therefore, a "quick reload" virtual button 101 in FIG. 1A is only used for loading a firearm when a trigger operation is received. Referring to FIG. 1B, in a second mode, each gun can be loaded with a plurality of bullets. Therefore, a "quick reload" virtual button 102 in FIG. 1B includes a main body button 102-1 and a pull-up menu button 102-2, and needs to carry the function of "loading" the firearm and carry the function of changing the type of bullets, that is, to load the firearm when a click operation on the main body button 102-1 is received and to display a pull-up menu 102-3 when a click operation on the pull-up menu button 102-2 is received, the pull-up menu including all types of bullets that can be loaded into the gun; and to use a bullet type indicated by a selection operation as a bullet type for next loading of the gun when a selection operation for the bullet type in the pull-up menu is received.

The "quick reload" virtual button has different presentation forms in the first mode and the second mode, but the presentation forms and operation modes of other virtual buttons are identical. If one panel with custom button positions is set for every mode, a plurality of sets of layout data need to be stored, resulting in a waste of storage space and increasing upload and download traffic.

Figure 2:
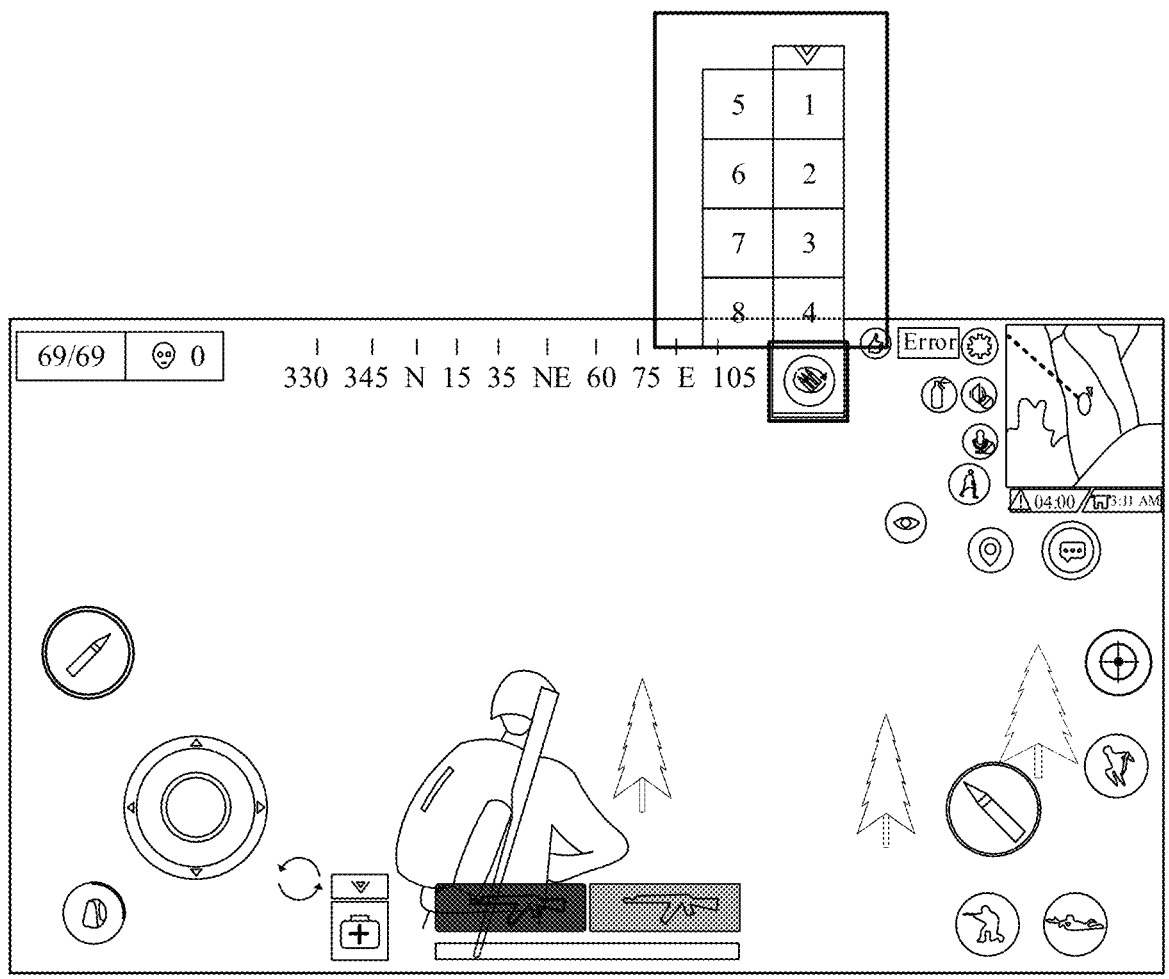
FIG. 2 is a schematic diagram of a presentation interface of a virtual button according to an embodiment of this application.

Furthermore, FIG. 2 is a schematic diagram of a presentation interface of a virtual button according to an embodiment of this application. Referring to FIG. 2, in event that the "quick reload" virtual button in the second mode is placed at the top of a virtual scene, the pull-up menu cannot be displayed, causing a problem of abnormal display.

Thereafter, embodiments of this application provide a method and an apparatus for adjusting the position of a virtual button, a device, and a computer-readable storage medium, which can reduce memory consumption during data processing and save data storage space, and are separately described in the following.

Figure 3:
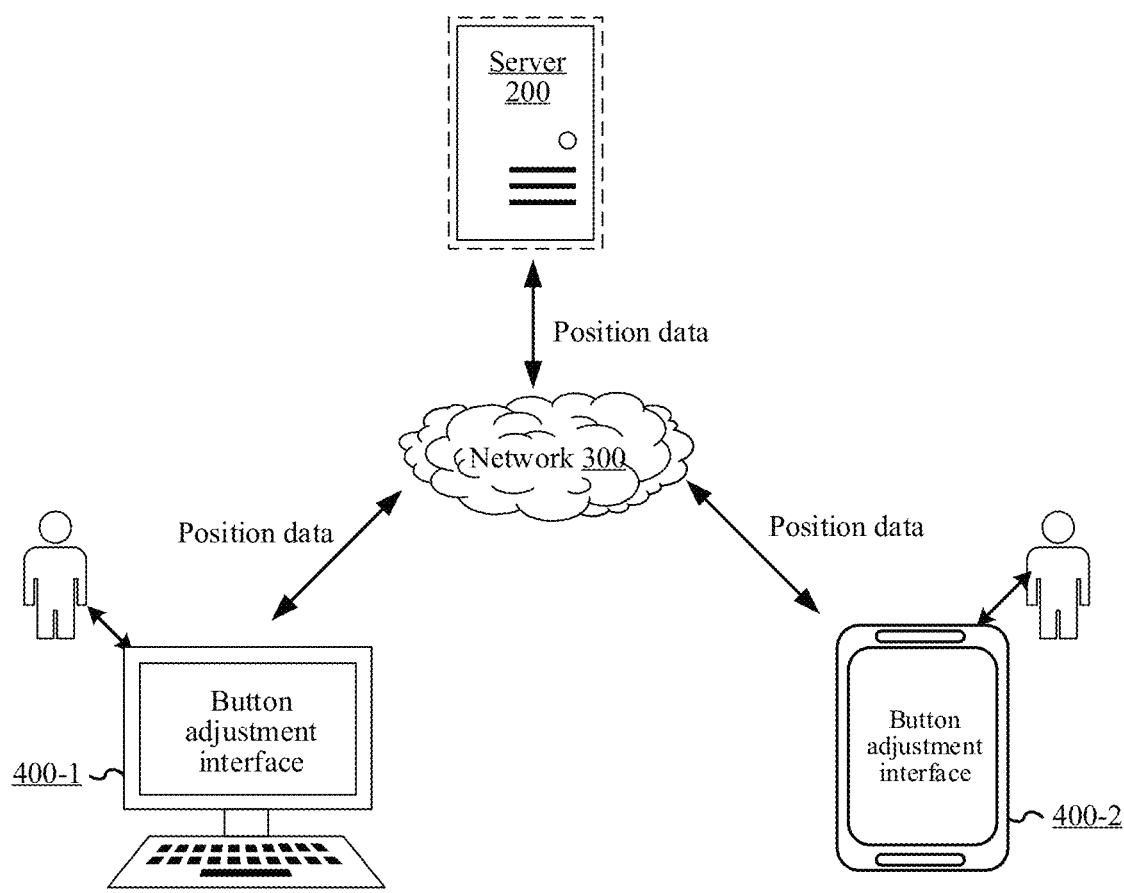
FIG. 3 is a schematic diagram of an implementation scenario of a method for adjusting the position of a virtual button according to an embodiment of this application.

FIG. 3 is a schematic diagram of an implementation scenario of a method for adjusting the position of a virtual button according to an embodiment of this application. To support an exemplary application, a terminal (a terminal 400-1 and a terminal 400-2 are exemplarily shown) is connected to a server 200 by a network 300. The network 300 may be a wide area network, a local area network or a combination of the two.

In an actual implementation, the terminal installs and runs an application that supports a virtual scene. The application may be any of a first-person shooter (FPS) game, a third-person shooter game, a multiplayer online battle arena (MOBA) game, a virtual reality application, a three-dimensional map program, a military simulation program, or a multiplayer gun battle survival game. A user uses a terminal to operate a virtual object in a virtual scene through a virtual button to perform an action. The action includes, but is not limited to, at least one of body posture adjustment, crawling, walking, running, cycling, jumping, driving, picking, shooting, attacking, and throwing. For example, the virtual object is a virtual character such as a simulated character role or a cartoon character role.

In an exemplary scenario, the user triggers a position adjustment instruction of the virtual button through a terminal 400-1. The terminal 400-1 presents a button adjustment interface of a virtual scene including a target virtual button; controls, in response to a movement operation for the target virtual button, the target virtual button to move in the button adjustment interface, to adjust a presentation position of the target virtual button in the virtual scene, there being at least two presentation forms of the target virtual button in the virtual scene; and presents prompt information in response to the target virtual button being moved to a boundary area in the button adjustment interface, to prompt that the target virtual button is displayed abnormally in the virtual scene when the target virtual button is in a target presentation form of the at least two presentation forms.

After the position adjustment is completed, the user may trigger a storage instruction through the terminal 400-1. The terminal acquires adjusted position data of the target virtual button, and transmits the adjusted position data of the target virtual button to the server 200, and the server 200 stores the position data of the target virtual button.

In event that the user triggers a loading instruction such as a game start instruction of a virtual scene through the terminal 400-1, the server calculates scene data in the virtual scene and the position data of the virtual button, and transmits the data to the terminal 400-1. The terminal 400-1 relies on graphics computing hardware to complete loading, parsing, and rendering of calculation display data, relies on graphics output hardware to output a virtual scene to form visual perception, and presents the target virtual button at the adjusted position in the virtual scene, to control the virtual object in the virtual scene through the target virtual button.

In some embodiments, the server 200 may be an independent physical server, or a server cluster or a distributed system composed of a plurality of physical servers, or a cloud server providing basic cloud computing services such as a cloud service, a cloud database, cloud computing, a cloud function, cloud storage, a network service, cloud communication, a middleware service, a domain name service, a security service, a content delivery network (CDN), big data, an artificial intelligence platform, and the like. The terminal may be a smart phone, a tablet computer, a laptop computer, a desktop computer, a smart speaker, a smart watch, and the like, which is not limited thereto. The terminal and the server may be directly or indirectly connected in a wired or wireless communication manner, which is not limited in the embodiments of this application.

Figures 4, 5:
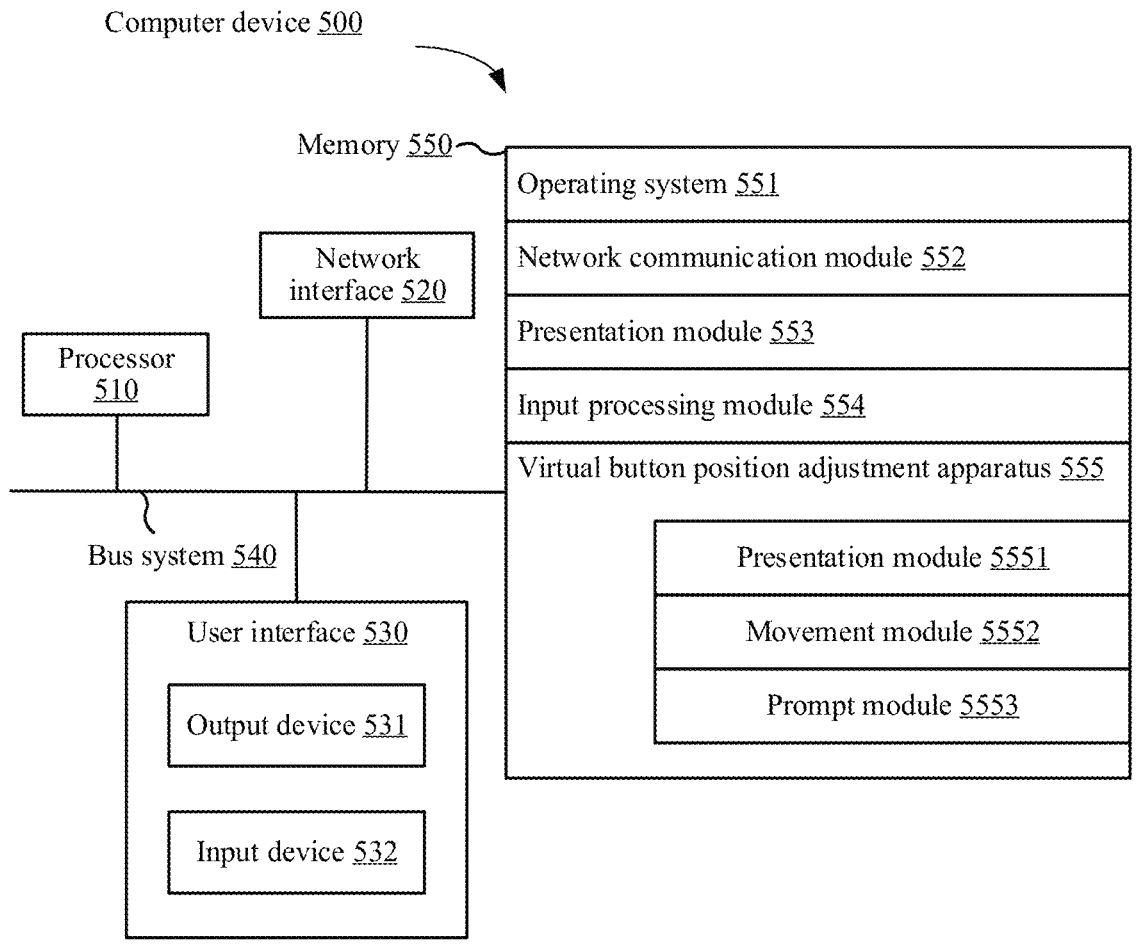
FIG. 4 is a schematic structural diagram of a computer device 500 according to an embodiment of this application.
FIG. 5 is a schematic flowchart of a method for adjusting the position of a virtual button according to an embodiment of this application.

FIG. 4 is a schematic structural diagram of a computer device 500 according to an embodiment of this application. In an actual application, the computer device 500 may be the terminal 400-1 or the server 200 in FIG. 3. For example, the computer device is the terminal 400-1 shown in FIG. 1. The computer device that implements the method for displaying information in a virtual scene in an embodiment of this application is described. The computer device 500 shown in FIG. 4 includes: at least one processor 510, a memory 550, at least one network interface 520, and a user interface 530. Components in the computer device 500 are coupled by a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 4.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and other input buttons and controls.

The memory 550 may be a removable memory, a non-removable memory, or a combination thereof. Exemplary hardware devices include a solid-state memory, a hard disk drive, an optical disk drive, and the like. The memory 550 optionally includes one or more storage devices that are physically remote from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 may store data to support various operations. Examples of the data include a program, a data structure, or a subset or a superset thereof, which are described below by using examples. Additionally, as used herein, the term module means hardware or a combination of hardware and software configured to perform, execute, or carry out one or more functions. For example, a module can be a circuit, such as an analog circuit, a digital circuit, an integrated circuit (IC), a processor executing instructions stored in a memory to execute the one or more functions, a memory or at least a part of the memory storing instructions executable by a processor to carry out the one or more functions, or any of various combinations thereof.

An operating system 551 includes a system program configured to process various basic system services and perform a hardware-related task, such as a framework layer, a core library layer, or a driver layer, and is configured to implement various basic services and process a hardware-based task.

A network communication module 552 is configured to reach another computing device through one or more (wired or wireless) network interfaces 520. Exemplary network interfaces 520 include: Bluetooth, Wireless Fidelity (Wi-Fi), a universal serial bus (USB), and the like.

The presentation module 553 is configured to enable the presentation of information (such as a user interface for operating a peripheral device and displaying content and information) via one or more output devices 531 (such as a display screen, a speaker, etc.) associated with the user interface 530.

An input processing module 554 is configured to detect one or more user inputs or interactions from one of the one or more input apparatuses 532 and translate the detected input or interaction.

In some embodiments, an information display device in the virtual scene according to the embodiments of this application may be implemented in a software manner. FIG. 4 shows an apparatus 555 for adjusting the position of a virtual button stored in the memory 550, which may be a software in the form of programs and plug-ins, and includes the following software modules: a presentation module 5551, a movement module 5552, and a prompt module 5553, which are logical and therefore can be combined or further split arbitrarily according to implement functions. The following describes functions of the modules.

In other embodiments, the apparatus for adjusting the position of a virtual button according to the embodiments of this application may be implemented in a hardware manner. In an example, the apparatus for adjusting the position of a virtual button according to embodiments of this application may be a processor in the form of a hardware decoding processor, which is programmed to perform the method for adjusting the position of a virtual button according to the embodiments of this application. For example, the processor in the form of a hardware decoding processor may adopt one or more application specific integrated circuits (ASICs), DSPs, PLDs, complex programmable logic devices (CPLDs), field-programmable gate arrays (FPGAs), or other electronic elements.

The method for adjusting the position of a virtual button according to the embodiments of this application is described in conjunction with an exemplary application and implementation of the terminal provided in the embodiments of this application.

FIG. 5 is a schematic flowchart of a method for adjusting the position of a virtual button according to an embodiment of this application, which is described with reference to steps shown in FIG. 5.

Step 501: A terminal presents a button adjustment interface of a virtual scene including a target virtual button.

In an actual application, an application supporting a virtual scene is installed on the terminal. The application may be any of an FPS game, a third-person shooter game, a MOBA game, a virtual reality application, a three-dimensional map program, a military simulation program, or a multiplayer gun battle survival game. The user may control an action of a virtual object in a virtual scene through a virtual button presented in the virtual scene. The action includes, but is not limited to, at least one of body posture adjustment, crawling, walking, running, cycling, jumping, driving, picking, shooting, attacking, and throwing. For example, the virtual object is a virtual character such as a simulated character role or a cartoon character role.

In an actual implementation, a user may trigger a button adjustment instruction before, during or after the presentation of a virtual scene. After receiving the button adjustment instruction, the terminal presents a button adjustment interface of a virtual scene including a target virtual button, and the user may adjust the position of the target virtual button based on the button adjustment interface.

For example, if a virtual scene is a game scene, the user may trigger the button adjustment instruction before the game is started, during the game, or after the game is ended. After receiving the button adjustment instruction, the terminal presents a button adjustment interface of a virtual scene including a target virtual button.

The button adjustment interface may include one or more virtual buttons. The virtual buttons are configured to control the actions of a virtual object in a virtual scene. Through the virtual adjustment interface, a user may adjust the position of one or more virtual buttons included in the virtual adjustment interface. The one or more virtual buttons include at least a target virtual button.

Step 502: Control, in response to a movement operation for the target virtual button, the target virtual button to move in the button adjustment interface, to adjust a presentation position of the target virtual button in the virtual scene.

There are at least two presentation forms of the target virtual button in the virtual scene.

In some embodiments, at least two modes are set in the virtual scene, and there are virtual buttons with the same or similar functions in different modes. The buttons with the same or similar functions in different modes are used as one virtual button, and the virtual buttons with the same or similar functions may have different presentation forms in different modes. The presentation form of the target virtual button in the virtual scene may correspond to a mode. For example, a first mode and a second mode are set. In event that a user selects the first mode, the target virtual button is presented in the virtual scene in a first presentation form. In event that the user selects the second mode, the target virtual button is presented in the virtual scene in a second presentation form.

In some embodiments, different presentation forms may be set for a virtual button in the same mode, the timing of switching a presentation form being diversified. For example, after a user-triggered instruction for switching a presentation form is received, the presentation form of the target virtual button is switched. In event that a duration of the virtual scene exceeds a continuous display duration threshold, that is, in event that a duration of an exercise simulation in military simulation software or a duration after a battle in a game is started exceeds the display duration threshold, the presentation form of the target virtual button is switched. In event that a first virtual object controlled by the user kills a particular quantity of enemies or obtains a particular quantity of points, the presentation form of the target virtual button is switched.

In some embodiments, the target virtual button may be controlled in the following manner to move in the button adjustment interface: in event that the movement operation is a drag operation, control the target virtual button to move in the button adjustment interface following the drag operation.

In an actual implementation, the movement operation may be a drag operation. A user performs a drag operation for the target virtual button. During the execution of the drag operation, the position of the target virtual button is adjusted synchronously according to a position indicated by the drag operation, for the position of the target virtual button to be consistent with the position indicated by the drag operation.

In an actual application, the drag operation may be triggered by swiping on a screen. The position touched by a hand of a user on the screen can be acquired, as the hand swipes on the screen, the target virtual button is controlled to following the hand, and the position of the target virtual button is a position touched by the hand.

In some embodiments, the movement operation includes a selection operation and a click operation. A terminal receives the selection operation for the target virtual button and controls the target virtual button to be in a pre-moving state before controlling the target virtual button to move in a button adjustment interface; the click operation triggered in the button adjustment interface is received. Correspondingly, the target virtual button may be controlled in the following manners to move in the button adjustment interface: determining a click position corresponding to the click operation, and controlling the target virtual button in the pre-moving state to move to the click position.

In an actual implementation, the movement operation includes a selection operation and a click operation. First, the user needs to trigger the selection operation to select the target virtual button from the button adjustment interface. The selection operation may be a click operation, long-press operation, a double-click operation or the like. In event that the terminal receives the selection operation for the target virtual button, the target virtual button may be controlled to be in the pre-moving state by adjusting a display state of the target virtual button, for example, a display color of the target virtual button, for the color of the target virtual button to be different from the color of the target virtual button in a non-pre-moving state before adjustment, thereby indicating that the target virtual button is in the pre-moving state; or the target virtual button may be controlled to jitter to indicate that the target virtual button is in the pre-moving state; then, the user may trigger a click operation in the button adjustment interface. The terminal controls the target virtual button to move to the click position corresponding to the click operation. The terminal may present a process of moving the target virtual button to the click position corresponding to the click operation, or may directly present a final state, that is, directly present the target virtual button at the click position.

Step 503: Present prompt information in response to the target virtual button being moved to a boundary area in the button adjustment interface, the prompt information being used for prompting that the target virtual button is displayed abnormally in the virtual scene when the target virtual button is in a target presentation form of the at least two presentation forms.

The boundary area corresponds to the target virtual button. In an actual implementation, sizes of the target virtual button in at least two presentation forms are acquired, the sizes being the lengths and widths of the target virtual button, and the largest length and width are determined from the lengths and widths. According to the largest length and width, the button adjustment interface is divided into areas such as a boundary area and a non-boundary area, for the target virtual button of each presentation form in the non-boundary area to be presented completely.

In an actual implementation, the target presentation form may be one or more presentation forms. For example, the target virtual button has three presentation forms. In event that the target virtual button is moved to the boundary area in the button adjustment interface, the target virtual button may be displayed abnormally in two presentation forms.

In some embodiments, in the process of controlling the movement of the target virtual button in the button adjustment interface, the boundary area in the button adjustment interface is presented in a target presentation mode, to distinguish the boundary area from a non-boundary area in the button adjustment interface.

In an actual implementation, after determining the target virtual button to be adjusted, the boundary area corresponding to the target virtual button in the button adjustment interface may be determined according to the sizes of the target virtual button in the presentation forms, and then the boundary area is presented in the target presentation mode. For example, the boundary area may be presented with target transparency, for the transparency of the boundary area to be less than that of other non-boundary areas.

In this way, the user may know from the presented boundary area that there is a problem of abnormal display in event that the target virtual button is moved to the boundary area, thereby avoiding moving the target virtual button to the boundary area as much as possible.

In some embodiments, the terminal may present the button adjustment interface in the following manner: determining an initial presentation form of the target virtual button in the at least two presentation forms of the target virtual button; and presenting the button adjustment interface including the target virtual button in the initial presentation form.

In an actual implementation, because the target virtual button has a plurality of presentation forms, any form may be selected from the plurality of forms as the initial presentation form of the target virtual button.

In some embodiments, to make the button adjustment interface as simple as possible, the presentation form with the smallest size or the simplest function may be selected as the initial presentation form from the plurality of presentation forms. For example, referring to FIG. 1A and FIG. 1B, a virtual button 101 in FIG. 1A is only configured to load a firearm in event that a trigger operation is received. A "quick reload" virtual button 102 in FIG. 1B needs to carry the function of "loading" the firearm and needs to carry the function of changing the type of bullets. That is, the function of the "quick reload" virtual button 102 in FIG. 1B is more complex and larger in size. The presentation form of the virtual button in FIG. 1A may be taken as the initial presentation form.

In some embodiments, the terminal may present prompt information in the following manner: switching the target virtual button from the initial presentation form to the target presentation form; and using the target virtual button in the target presentation form as the prompt information.

In an actual implementation, in response to the target virtual button being moved to the boundary area, the terminal acquires display data of the target virtual button in the target presentation form. The display data of the target virtual button in the target presentation form is parsed and rendered to present the target virtual button in the target presentation form, and the target virtual button in the initial presentation form is canceled while the target virtual button in the target presentation form is presented.

The terminal switches the target virtual button from the initial presentation form to the target presentation form, to prompt a user that, there is a problem of abnormal display in event that the target virtual button is in the target presentation form. In addition, the target virtual button is presented in the target presentation form, so that the user can clearly know which part of the target virtual button is displayed abnormally.

Figure 6:
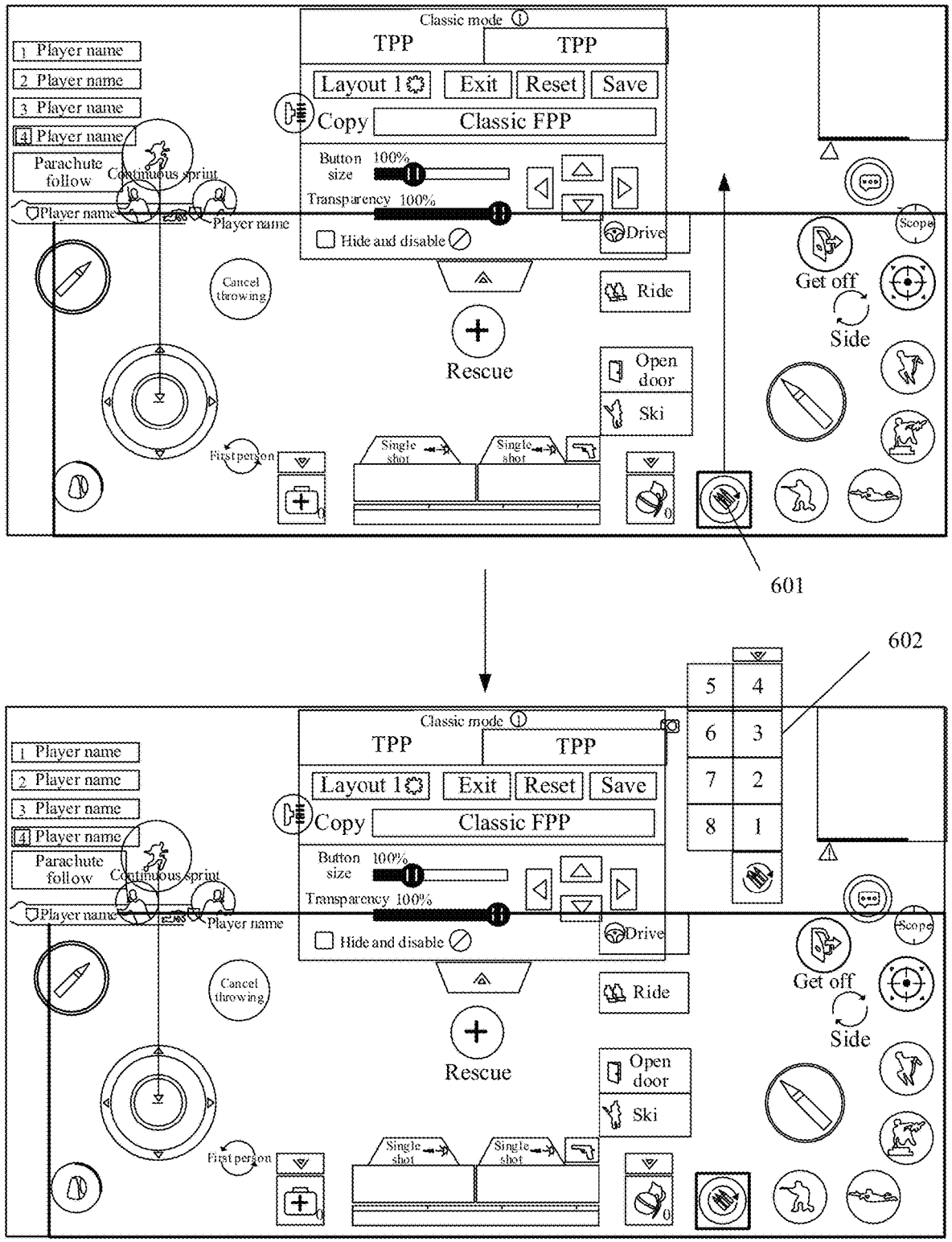
FIG. 6 is a schematic diagram of a presentation interface of prompt information according to an embodiment of this application.

For example, FIG. 6 is a schematic diagram of a presentation interface of prompt information according to an embodiment of this application. Referring to FIG. 6, in event that the target virtual button is moved from the non-boundary area (a normal area) to the boundary area, the target virtual button is switched from an initial presentation form 601 to a target presentation form 602. As shown in the figure, in event that the target virtual button is moved to the boundary area, the target virtual button in the target presentation form only presents a part of the content, a part of the content is not presented, and the part of the content that is not presented is a part that is not displayed abnormally.

In some embodiments, the terminal may present prompt information in the following manner: acquiring a presentation position of the target virtual button in the initial presentation form in the boundary area; presenting the target virtual button in the target presentation form at the presentation position, for the target virtual button in the initial presentation form and the target virtual button in the target presentation form to be presented in an overlapping manner; and using the target virtual button in the target presentation form as the prompt information.

In an actual implementation, in event that the target virtual button is moved to the boundary area, the terminal acquires display data of the target virtual button in the target presentation form, and acquires the presentation position of the target virtual button in the initial presentation form in the boundary area. Then the display data of the target virtual button in the target presentation form is parsed and rendered in the presentation position, to present the target virtual button in the target presentation form at the presentation position, for the target virtual button in the initial presentation form and the target virtual button in the target presentation form to be presented in an overlapping manner. The target virtual button in the initial presentation form may be located above the target virtual button in the target presentation form or below the target virtual button in the target presentation form.

In an actual application, different transparency may be used for presenting the target virtual button in the initial presentation form and the target virtual button in the target presentation form. For example, the transparency of the target virtual button in the initial presentation form may be 1, and the transparency of the target virtual button in the target presentation form is 0.5. That is, the target virtual button in the initial presentation form is completely opaque, and the target virtual button in the target presentation form is semi-transparent, to distinguish between target virtual buttons in different presentation forms.

Figure 7:
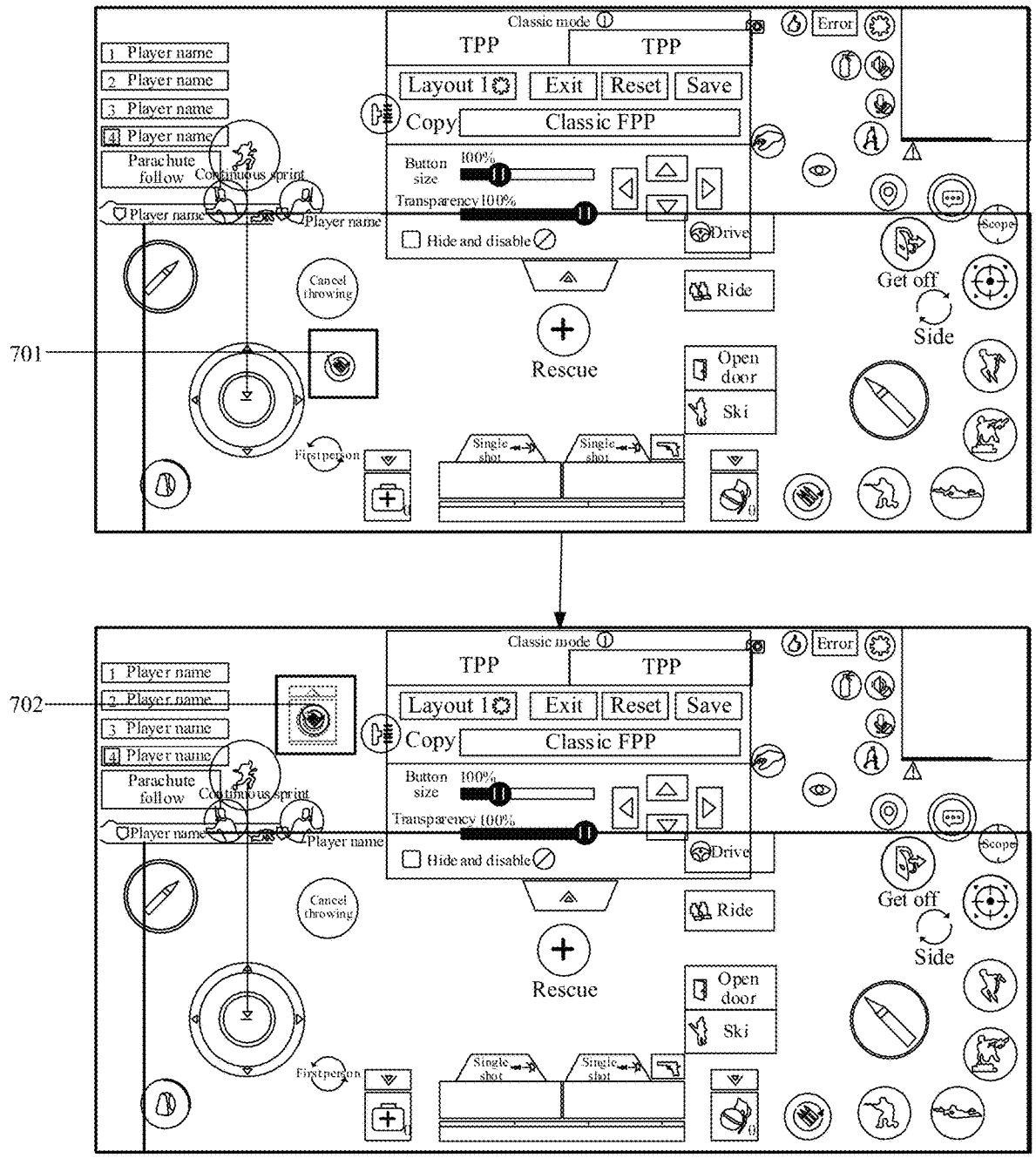
FIG. 7 is a schematic diagram of a presentation interface of prompt information according to an embodiment of this application.

For example, FIG. 7 is a schematic diagram of a presentation interface of prompt information according to an embodiment of this application. Referring to FIG. 7, in event that the target virtual button is in a non-boundary area (a normal area), only a target virtual button 701 in the initial presentation form is presented. In event that the target virtual button is moved from the non-boundary area (the normal area) to the boundary area, the target virtual button in the initial presentation form and a target virtual button 702 in the target presentation form are simultaneously presented. The transparency of the target virtual button in the target presentation form is less than that of the target virtual button in the initial presentation form, and is located at the target virtual button in the initial presentation form.

In some embodiments, the terminal may also receive a movement operation for the target virtual button in the initial presentation form; and control, in response to the movement operation, the target virtual button in the initial presentation form to move in the button adjustment interface, and control the target virtual button in the target presentation form to move synchronously along with the movement of the target virtual button in the initial presentation form.

In event that the target virtual button is presented in a plurality of presentation forms at the same time, a user triggers a movement operation for the target virtual button in one of the two presentation forms, and the terminal is to simultaneously control the movement of the target virtual buttons in the plurality of presentation forms.

In an actual implementation, in event that the user triggers the movement operation of the target virtual button in the initial presentation form, the position indicated by the movement operation is acquired. According to the position indicated by the movement operation, the target virtual button in the initial presentation form and the target virtual button in the target presentation form are controlled to move synchronously in the button adjustment interface.

In some embodiments, the terminal may present the prompt information in the following manner: presenting a prompt interface in the form of a floating window, for the floating window to float above the button adjustment interface, and presenting the prompt information in the floating window.

In an actual implementation, in event that the target virtual button is moved to the boundary area in the button adjustment interface, a prompt interface is presented in the form of a floating window, and the prompt information is presented in the floating window. The prompt information may be text information or image information.

Figure 8:
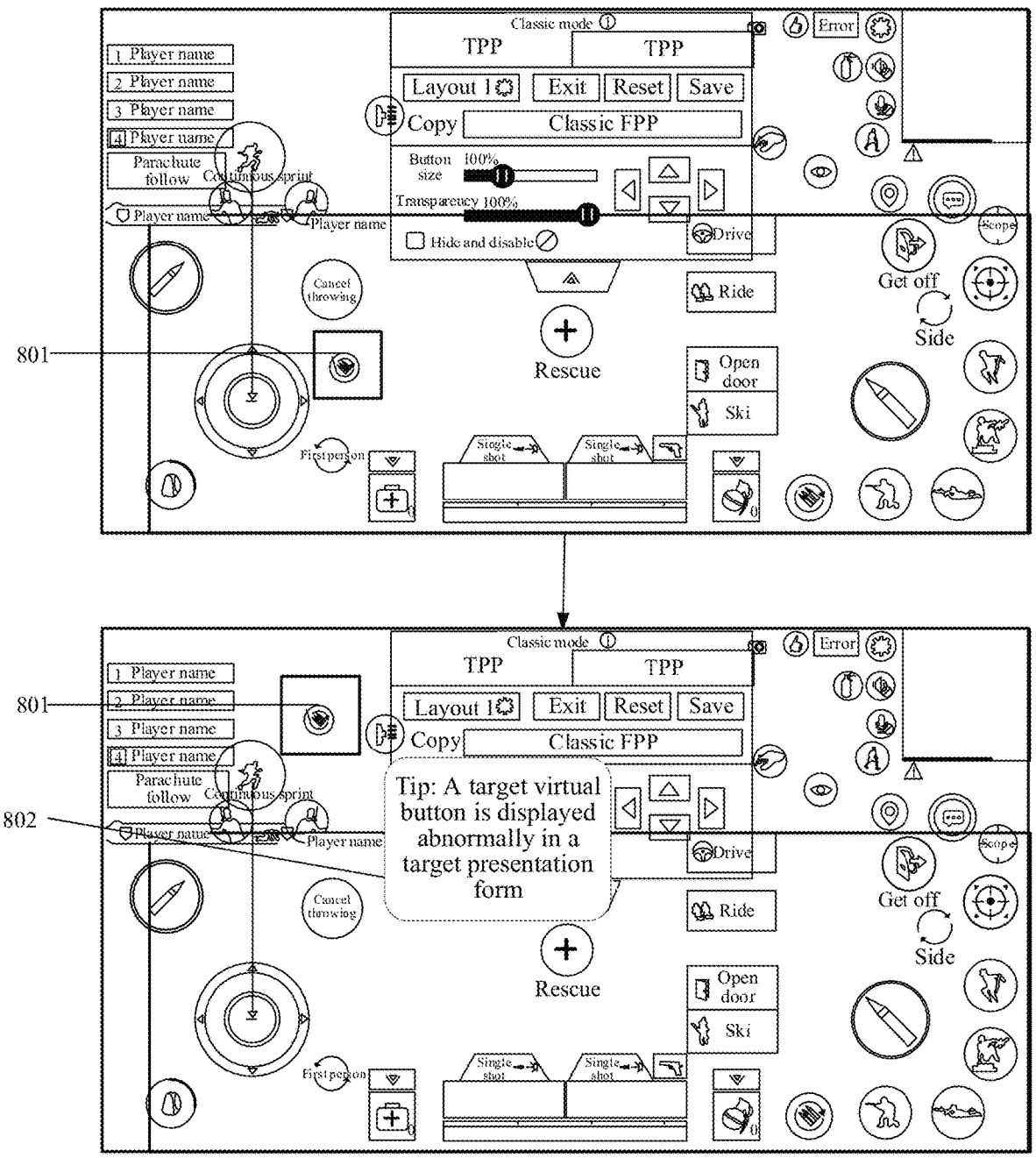
FIG. 8 is a schematic diagram of a presentation interface of prompt information according to an embodiment of this application.

For example, FIG. 8 is a schematic diagram of a presentation interface of prompt information according to an embodiment of this application. Referring to FIG. 8, in event that the target virtual button 801 is moved to the boundary area in the button adjustment interface, a prompt interface 802 is presented, and text prompt information "The target virtual button is displayed abnormally in the target presentation form" is presented in the prompt interface, to prompt the user that the target virtual button is displayed abnormally in the virtual scene in event that the target virtual button is in the target presentation form.

In some embodiments, a combination of a plurality of prompt information may be used for prompting a user. For example, in event that the target virtual button is moved to the boundary area in the button adjustment interface, the target virtual button in the initial presentation form and the target virtual button in the target presentation form are simultaneously presented, and text prompt information is presented.

In some embodiments, the terminal may acquire a target position of the target virtual button in event that the target virtual button stops moving in the button adjustment interface. Correspondingly, after the presenting prompt information, the terminal may use, in response to a position determination instruction for the target position, the target position as the presentation position of the target virtual button in the virtual scene in event that the target virtual button is in a non-target presentation form; determine, based on the target position, at least one candidate position that is in a non-boundary area and matches the target presentation form; and select a candidate position from the at least one candidate position as the presentation position of the target virtual button in the virtual scene in event that the target virtual button is in the target presentation form.

In an actual implementation, the position determination instruction may be triggered by a release operation, that is, in event that the movement operation is a drag operation, a user drags the target virtual button to the target position and then performs the release operation, to trigger the position determination instruction. Alternatively, the position determination instruction may be triggered by a save operation. That is, in event that the user moves the target virtual button to the target position, a save operation may be triggered to save the positions of virtual buttons after the movement. The position determination instruction may be triggered in event that the user triggers the save operation.

Because there is a problem of abnormal display in event that the target virtual button in the target presentation form is at the target position, while the target virtual button in a non-target presentation form can be displayed normally at the target position. Based on this, the target position is used as the presentation position of the target virtual button in the virtual scene in event that the target virtual button is in the non-target presentation form, and then a position is reselected from the non-boundary area as the presentation position of the target virtual button in the virtual scene in event that the target virtual button is in the target presentation form.

In an actual implementation, at least one position having a distance within a range to the target position may be selected from the non-boundary area, or may be randomly selected from the non-boundary area. The selection method of the candidate position is not limited thereto.

In some embodiments, the candidate position matching the target presentation form may be selected from the non-boundary area, then the candidate position is the presentation position of the target virtual button in the virtual scene in event that the target virtual button is in the target presentation form.

In some embodiments, at least two candidate positions matching the target presentation form may be selected from the non-boundary area. Then, the terminal may randomly select one of the at least two candidate positions matching the target presentation form as the presentation position of the target virtual button in the virtual scene in event that the target virtual button is in the target presentation form. Alternatively, at least two candidate positions may be marked in the button adjustment interface, and a user triggers a selection operation to select one of the at least two candidate positions as the presentation position of the target virtual button in the virtual scene in event that the target virtual button is in the target presentation form.

In some embodiments, the terminal may acquire a target position of the target virtual button in event that the target virtual button stops moving in the button adjustment interface. Correspondingly, after the presenting prompt information, the method further includes: using, in response to a position determination instruction for the target position, the target position as the presentation position of the target virtual button in the virtual scene in event that the target virtual button is in a non-target presentation form; presenting the target virtual button in the target presentation form in a non-boundary area in the button adjustment interface; and determining, based on the target virtual button in the target presentation form and in response to a position selection operation, a position indicated by the position selection operation as the presentation position of the target virtual button in the target presentation form in the virtual scene.

The position selection operation is triggered based on the target virtual button in the target presentation form. In an actual implementation, the terminal may use the target position as the presentation position of the target virtual button in the virtual scene in event that the target virtual button is in the non-target presentation form, and then present a target virtual button in the target presentation form in the non-boundary area. The position of the target virtual button is the presentation position of the target virtual button in the target presentation form in the virtual scene.

In some embodiments, if the position of the target virtual button is the position that a user wants to select, the position selection operation may be directly triggered, and the position of the target virtual button is used as the presentation position of the target virtual button in the target presentation form in the virtual scene. If the position of the target virtual button is not the position that the user wants to select, the user may trigger a movement operation of the target virtual button in the target presentation form, to adjust the position of the target virtual button in the target presentation form to a position a user wants to select, then the position selection operation is triggered, and then an adjusted position of the target virtual button is used as the presentation position of the target virtual button in the target presentation form in the virtual scene.

In some embodiments, in event that the target virtual button is moved to the boundary area in the button adjustment interface, the target virtual button in the target presentation form is presented in the non-boundary area. That is, two target virtual buttons are presented at the same time. During the movement of the virtual button in the boundary area, the target virtual button in the target presentation form also moves. However, the target virtual button in the target presentation form can only move in the non-boundary area. In event that the position determination instruction is received, the position of the target virtual button in the target presentation form is used as the presentation position of the target virtual button in the target presentation form in the virtual scene.

Figure 9:
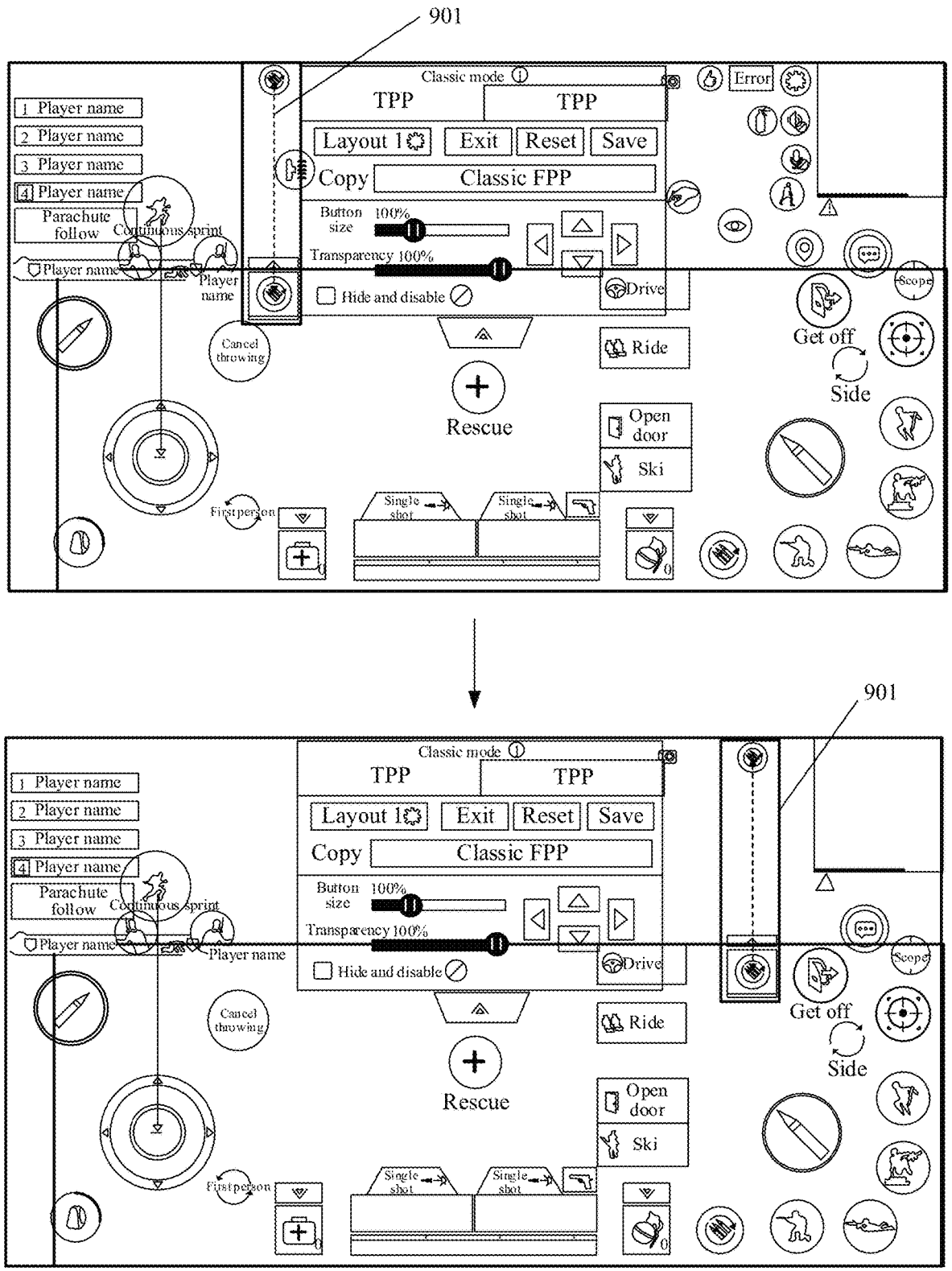
FIG. 9 is a schematic diagram of a presentation of a target virtual button according to an embodiment of this application.

FIG. 9 is a schematic diagram of a presentation of a target virtual button according to an embodiment of this application. Referring to FIG. 9, as shown by 901, the target virtual button in the target presentation form is presented right below the target virtual button in the initial presentation form. The target virtual button in the target presentation form is located in the non-boundary area. In event that the target virtual button in the initial presentation form is moved to the right, the target virtual button in the target presentation form also moves to the right.

In some embodiments, in event that the target virtual button is moved to a non-boundary area in the button adjustment interface, the terminal may acquire a target position of the target virtual button in event that the target virtual button stops moving in the button adjustment interface; and use the target position as the presentation position of the target virtual button in the virtual scene in event that the target virtual button is in any one of the at least two presentation forms.

In an actual implementation, in event that the target virtual button is moved to a non-boundary area in the button adjustment interface, the target virtual button may be displayed normally in any presentation form. Based on this, the target position is directly used as the presentation position of the target virtual button in the virtual scene in event that the target virtual button is in the at least two presentation forms.

The embodiments of this application are applied, so that positions of a target virtual button in a plurality of presentation forms can be adjusted at the same time, thereby reducing data processing and saving storage space compared with the setting of a plurality of sets of button positions. In addition, prompt information is presented in event that the target virtual button is moved to a boundary area in the button adjustment interface to prompt a user that the target virtual button is displayed abnormally, thereby avoiding the problem of abnormal display of the target virtual button.

Figure 10:
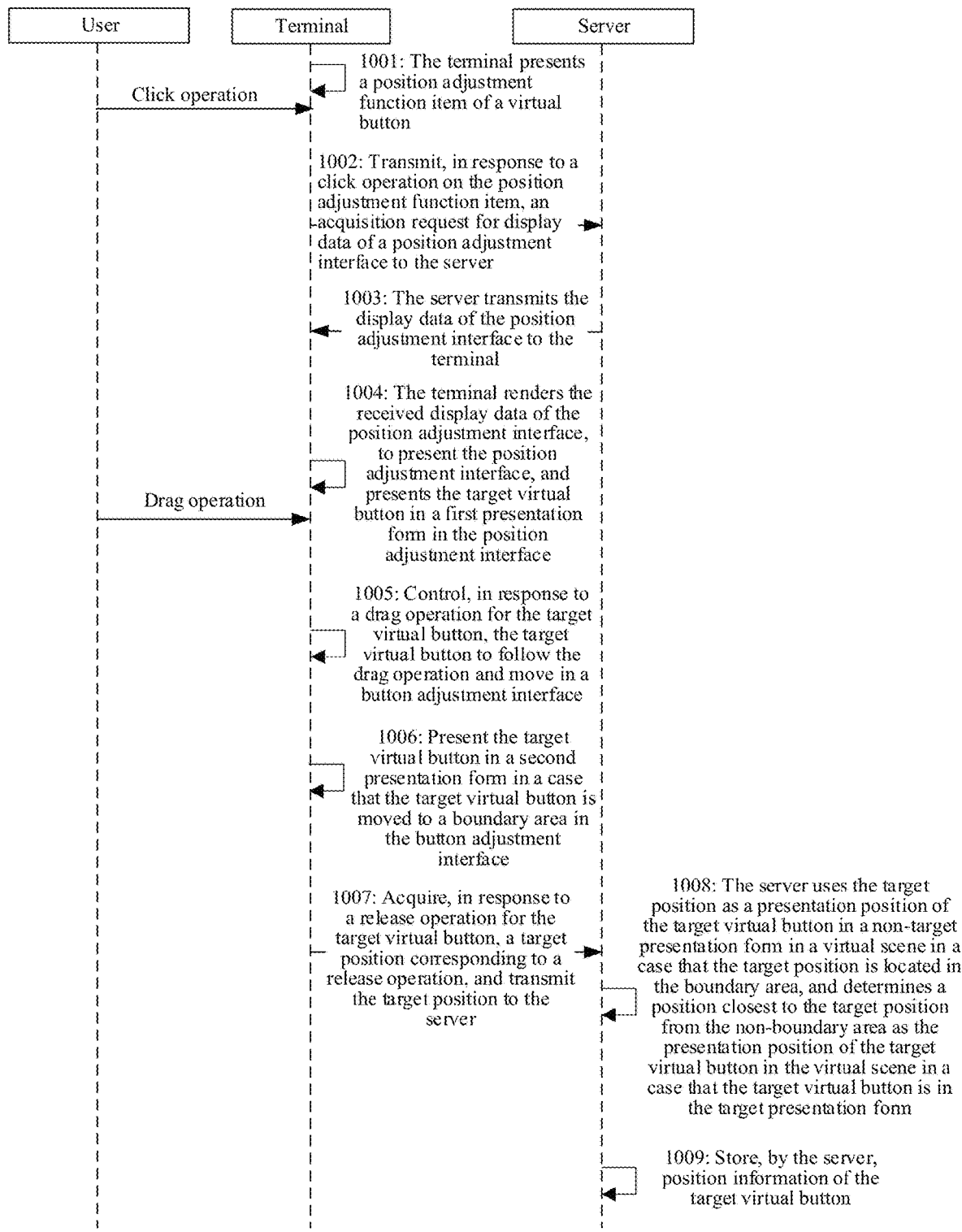
FIG. 10 is a schematic flowchart of a method for adjusting the position of a virtual button according to an embodiment of this application.

The following continues to describe the method for adjusting the position of a virtual button according to the embodiments of this application, which is implemented by a terminal and a server in cooperation. FIG. 10 is a schematic flowchart of a method for adjusting the position of a virtual button according to an embodiment of this application. Referring to FIG. 10, the method for adjusting the position of a virtual button according to the embodiments of this application includes the following steps:

Step 1001: A terminal presents a position adjustment function item of a virtual button.

Step 1002: Transmit, in response to a click operation on the position adjustment function item, an acquisition request for display data of a position adjustment interface to the server.

Step 1003: The server transmits the display data of the position adjustment interface to the terminal.

The server determines the display data of the position adjustment interface based on the acquisition request, and returns the determined display data to the terminal.

Step 1004: The terminal renders the received display data of the position adjustment interface, to present the position adjustment interface, and presents the target virtual button in a first presentation form in the position adjustment interface.

Step 1005: Control, in response to a drag operation for the target virtual button, the target virtual button to follow the drag operation and move in the button adjustment interface.

Step 1006: Present the target virtual button in a second presentation form in event that the target virtual button is moved to a boundary area in the button adjustment interface.

Step 1007: Acquire, in response to a release operation for the target virtual button, a target position corresponding to the release operation, and transmit the target position to the server.

Step 1008: The server uses the target position as a presentation position of the target virtual button in a non-target presentation form in a virtual scene in event that the target position is located in the boundary area, and determines a position closest to the target position from the non-boundary area as the presentation position of the target virtual button in the virtual scene in event that the target virtual button is in the target presentation form.

Step 1009: Store, by the server, the position information of the target virtual button.

The embodiments of this application are applied, so that positions of a target virtual button in a plurality of presentation forms can be adjusted at the same time, thereby reducing data processing and saving storage space compared with the setting of a plurality of sets of button positions. In addition, in event that the target position is located in the boundary area, a position closest to the target position is determined from the non-boundary area as the presentation position of the target virtual button in the virtual scene in event that the target virtual button is in the target presentation form, thereby avoiding the problem of abnormal display of the target virtual button.

In the following, an exemplary application of this embodiment of this application in an actual application scenario is described.

An example in which there are two modes that respectively correspond to a target virtual button in different presentation forms is used to describe the method for adjusting the position of a virtual button according to the embodiments of this application. The first mode corresponds to the target virtual button in the first presentation form, and the second mode corresponds to the target virtual button in the second presentation form, the size of the target virtual button in the second presentation form being greater than that of the target virtual button in the first presentation form, resulting in that the target virtual button in the first presentation form can be displayed normally whereas the target virtual button in the second presentation form is display abnormally in some areas.

In an actual implementation, first the button adjustment interface is divided into a normal area and a boundary area. The normal area is an area in which the target virtual button in the second presentation form can be completely presented without a problem of abnormal display. The boundary area is an area in which the target virtual button in the second presentation form is displayed abnormally.

Figure 11:
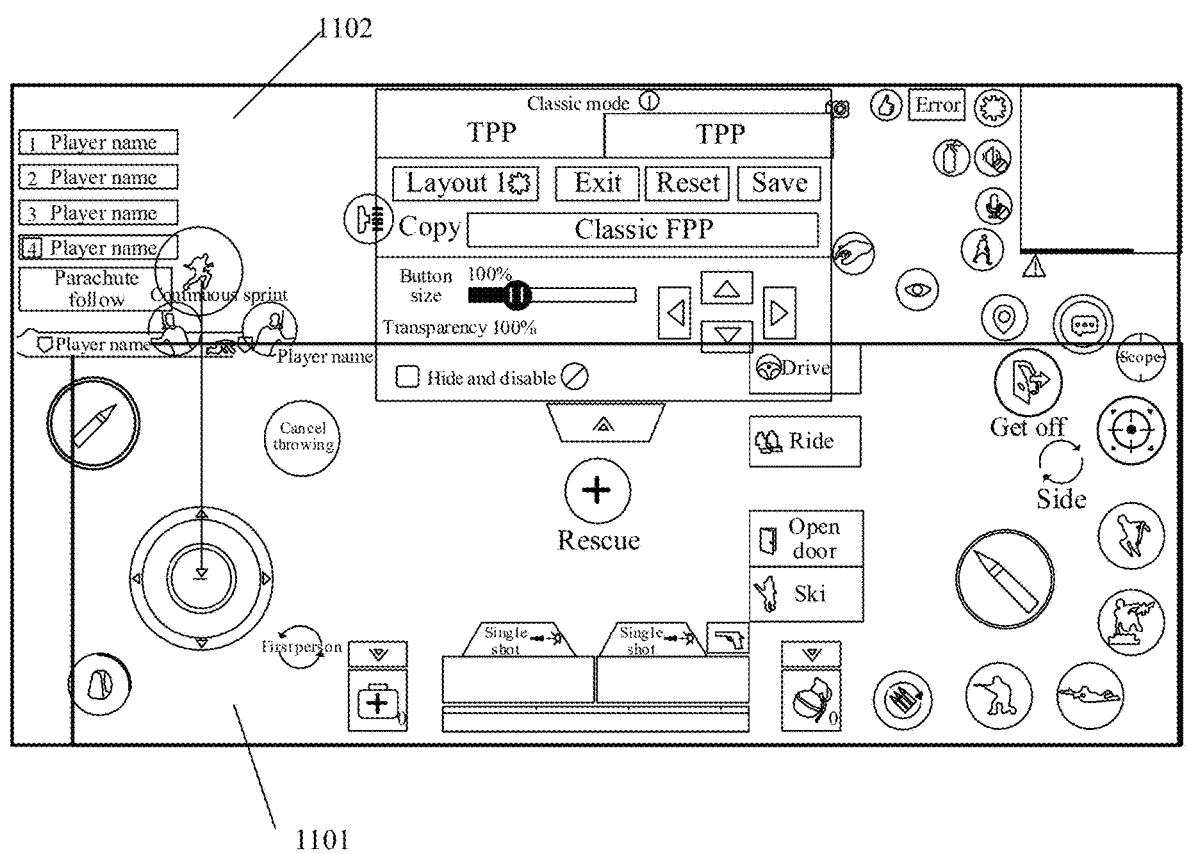
FIG. 11 is a schematic diagram of an interface for area division according to an embodiment of this application.

FIG. 11 is a schematic diagram of an interface for area division according to an embodiment of this application. Referring to FIG. 11, the button adjustment interface is divided into a normal area 1101 and a boundary area 1102. In the normal area 1101, both the target virtual button in the first presentation form and the target virtual button in the second presentation form can be displayed normally. However, in the boundary area 1102, the target virtual button in the second presentation form cannot be displayed normally.

Figure 12A:
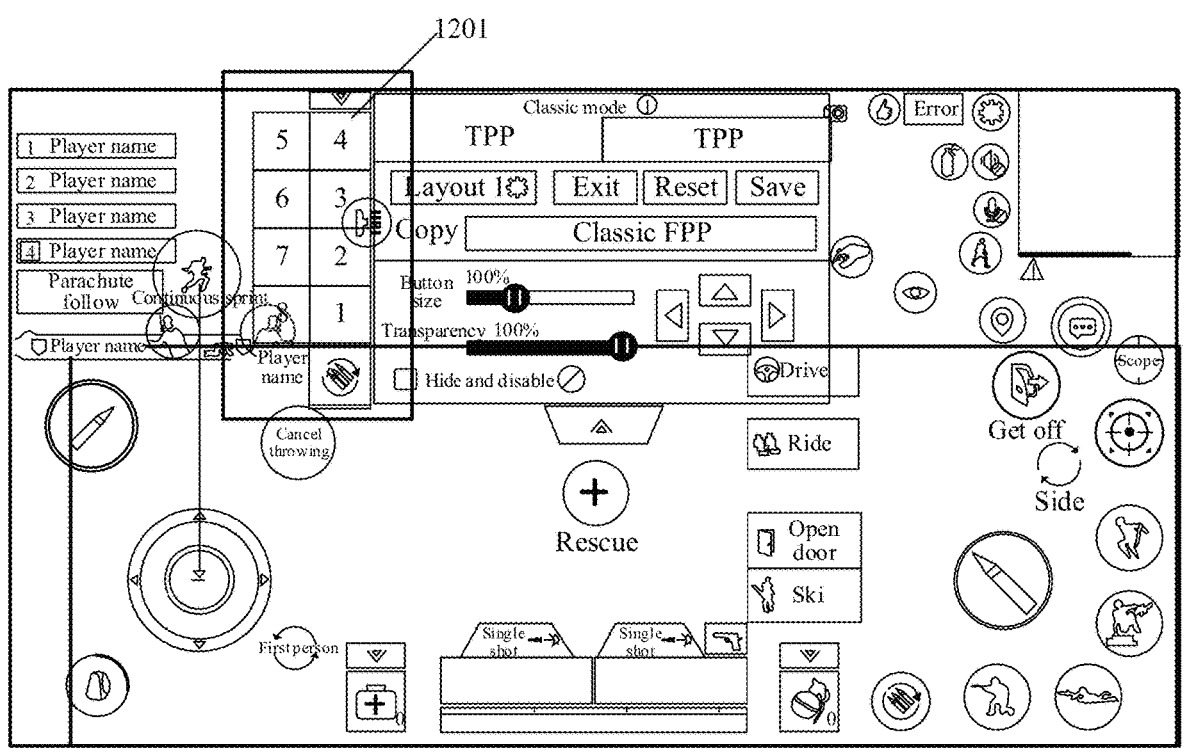
FIG. 12A and FIG. 12B are schematic diagrams of a presentation of a target virtual button according to an embodiment of this application.
Figure 12B:
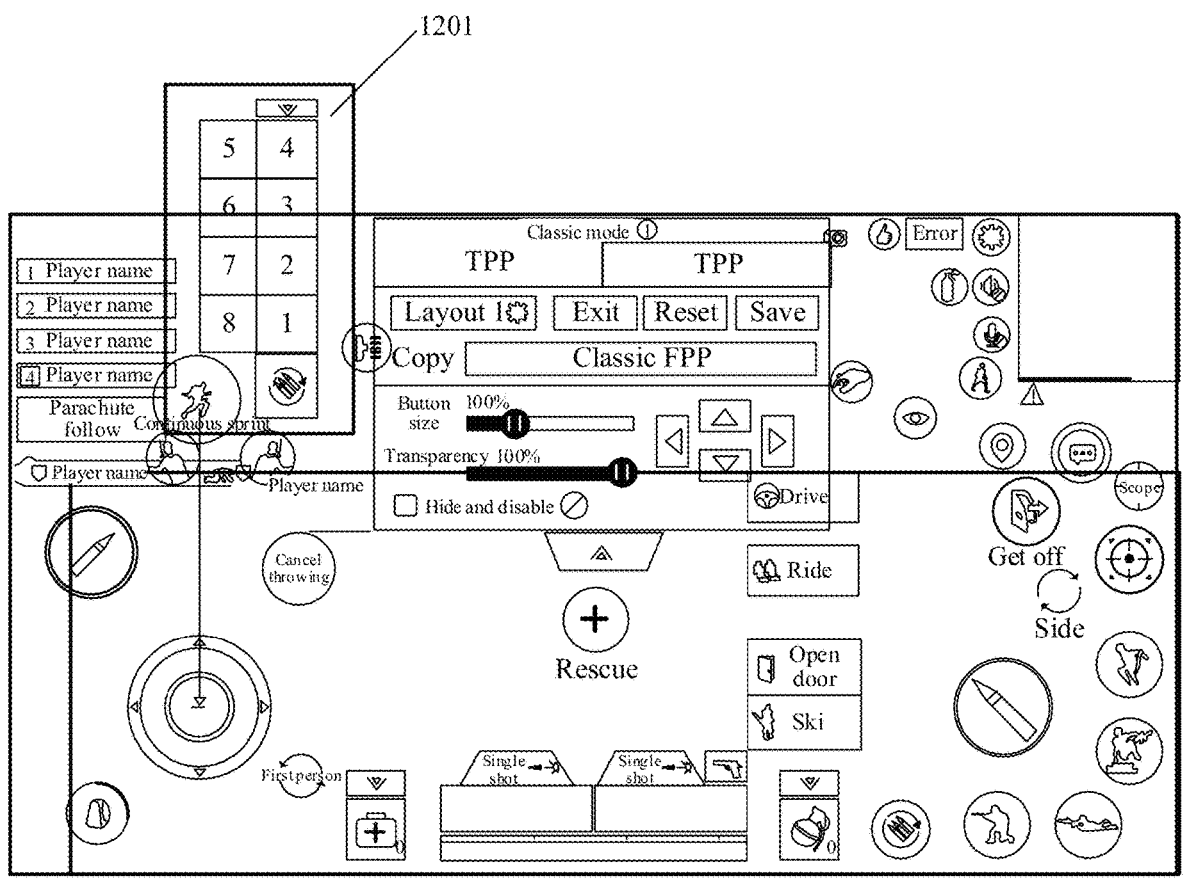

FIG. 12A and FIG. 12B are schematic diagrams of a presentation of a target virtual button according to an embodiment of this application. Referring to FIG. 12A, in the normal area, the target virtual button 1201 in the second presentation form can be displayed normally. Referring to FIG. 12B, in the boundary area, a part of the content of the target virtual button 1201 in the second presentation form is outside a presentation area. That is, this part of the content cannot be displayed normally.

The manner of area division corresponds to the target virtual button. For example, the area division herein is determined by the size of the target virtual button in the second presentation form.

Then, a user may trigger a movement operation for the target virtual button through the button adjustment interface. The movement operation herein may be a drag operation, and the target virtual button moves synchronously with the drag operation, to adjust the position of the target virtual button.

During the movement, if the target virtual button is in the normal area, only the target virtual button in the first presentation form is displayed. If the target virtual button is in the boundary area, the target virtual button in the first presentation form and the target virtual button in the second presentation form are presented in an overlapping manner. For example, the target virtual button in the second presentation form is displayed in the form of a shadow below the target virtual button in the first presentation form. Text prompt information may also be triggered at the same time to inform a user that the newly presented virtual button is the target virtual button in the second presentation form. In this case, if the user continues to trigger the movement operation for the target virtual button, the target virtual button in the first presentation form and the target virtual button in the second presentation form move synchronously.

In event that a user triggers a position determination instruction, that is, in event that the user releases a hand, a position where the user releases the hand is acquired. In event that the position where the user releases the hand is in the normal area, the positions of the target virtual button in the first mode and the second mode are set to the position where the user releases the hand. In event that the position where the user releases the hand is in the boundary area, the position of the target virtual button in the first mode is set to the position where the user releases the hand, and the position of the target virtual button in the second mode is set to a position that is in the normal area and matches the position where the user releases the hand, for example, a position that is in the normal area and is closest to the position where the user releases the hand.

Figure 13:
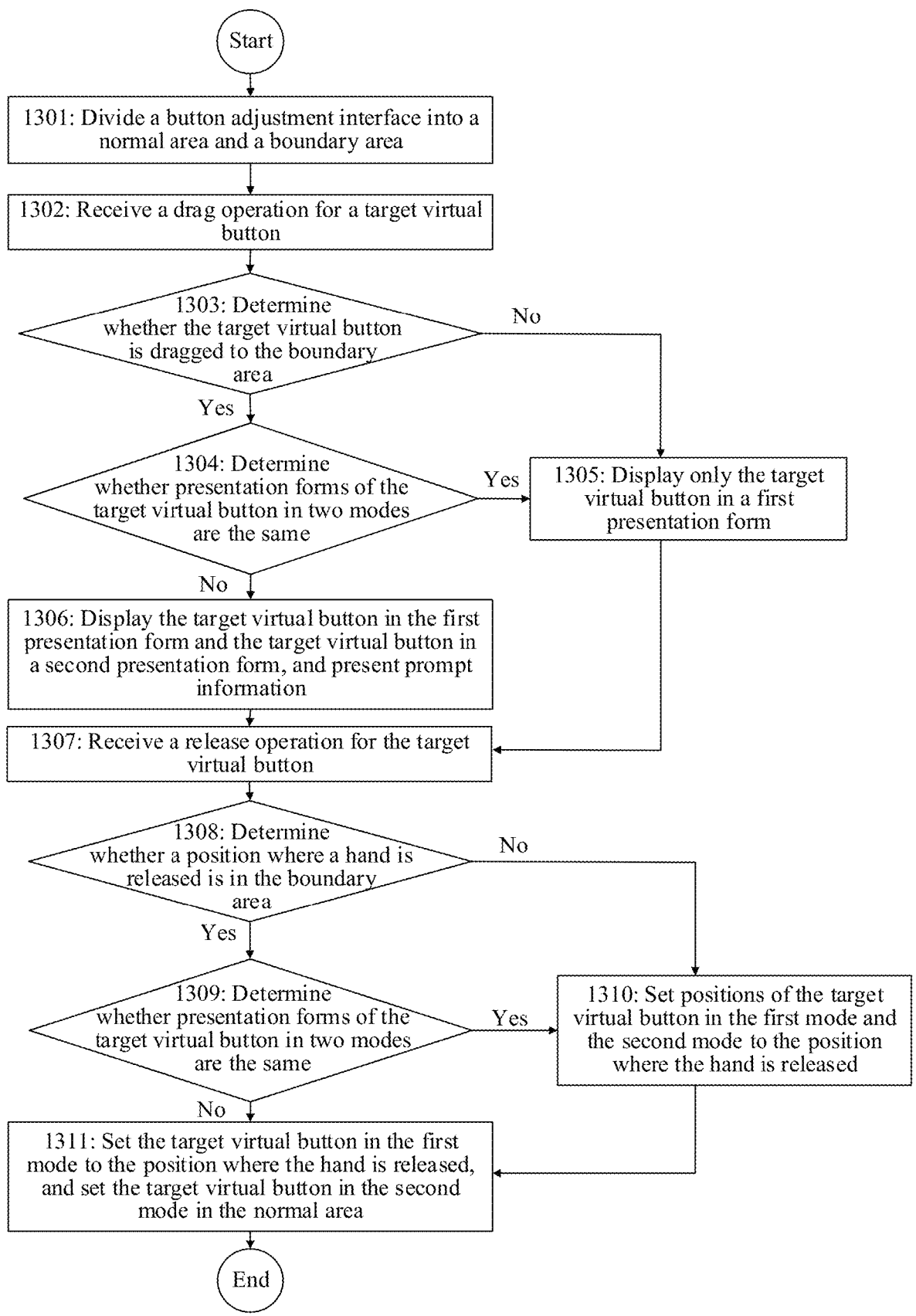
FIG. 13 is a schematic flowchart of a method for adjusting the position of a virtual button according to an embodiment of this application.

The following describes an implementation process of the embodiments of this application on a functional side. FIG. 13 is a schematic flowchart of a method for adjusting the position of a virtual button according to an embodiment of this application. Referring to FIG. 13, the method for adjusting the position of a virtual button according to the embodiments of this application includes the following steps:

Step 1301: Divide a button adjustment interface into a normal area and a boundary area.

The manner of area division is associated with a presentation form and size of a target virtual button.

Step 1302: Receive a drag operation for a target virtual button.

Step 1303: Determine whether the target virtual button is dragged to the boundary area, and if yes, perform step 1304, or otherwise, perform step 1305.

Step 1304: Determine whether presentation forms of the target virtual button in two modes are the same, and if yes, perform step 1305, or otherwise, perform step 1306.

Step 1305: Display Only the target virtual button in a first presentation form.

Step 1306: Display the target virtual button in the first presentation form and the target virtual button in a second presentation form, and present prompt information.

The target virtual button in the second presentation form has a transparency less than that of the target virtual button in the first presentation form.

Step 1307: Receive a hand-releasing operation for the target virtual button.

Step 1308: Determine whether a position where a hand is released is in the boundary area, and if yes, perform step 1309, or otherwise, perform step 1310.

Step 1309: Determine whether the presentation forms of the target virtual button in the two modes are the same, and if yes, perform step 1310, or otherwise, perform step 1311.

Step 1310: Set positions of the target virtual button in the first mode and the second mode to the position where the hand is released.

Step 1311: Set the target virtual button in the first mode to the position where the hand is released, and set the target virtual button in the second mode in the normal area.

Figure 14:
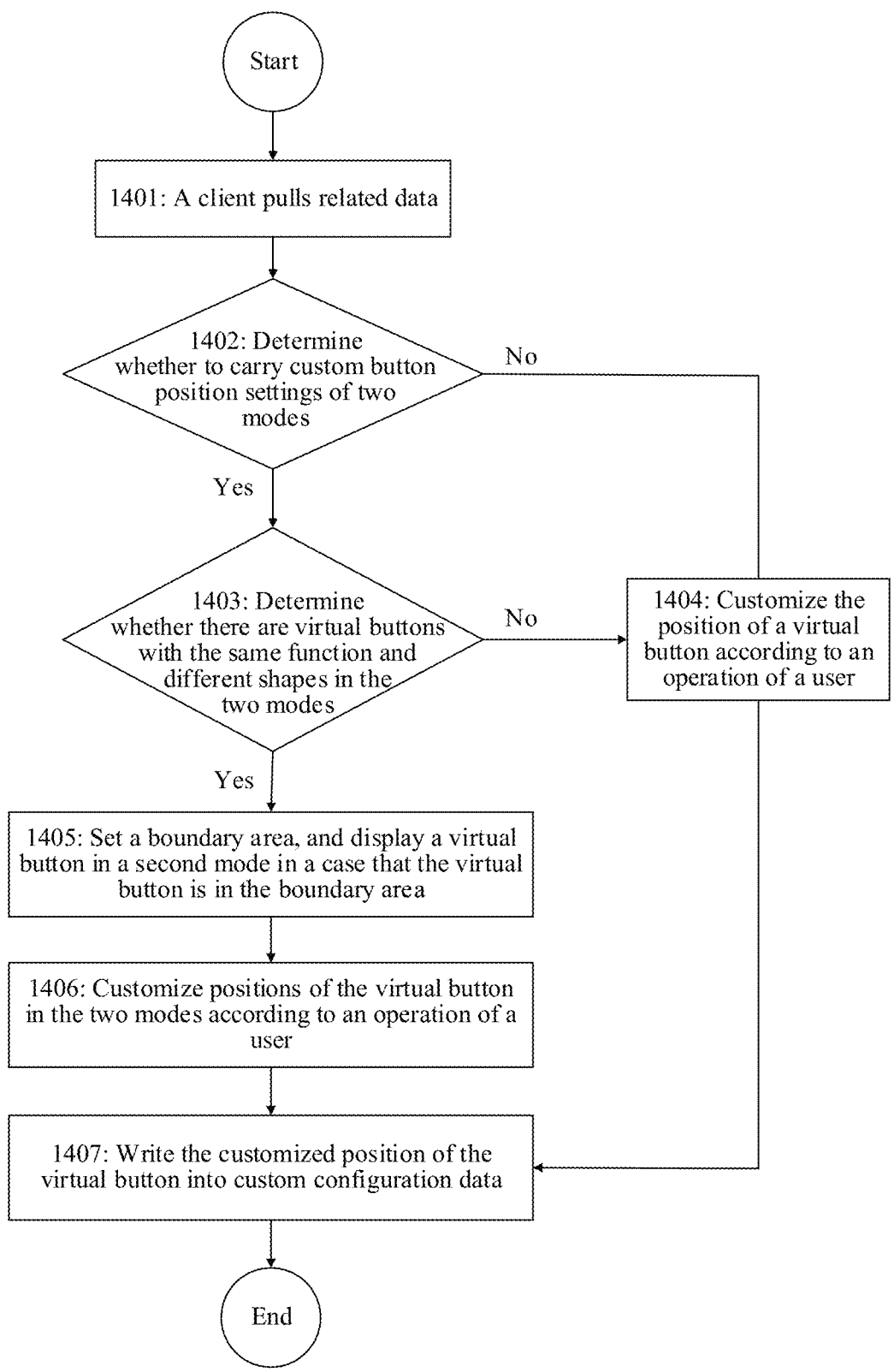
FIG. 14 is a schematic flowchart of a method for adjusting the position of a virtual button according to an embodiment of this application.

The following describes an implementation process of the embodiments of this application on a client side. FIG. 14 is a schematic flowchart of a method for adjusting the position of a virtual button according to an embodiment of this application. Referring to FIG. 14, the method for adjusting the position of a virtual button according to the embodiments of this application includes the following steps:

Step 1401: A client pulls related data.

The related data includes data such as presentation forms, sizes, and presentation positions of virtual buttons.

Step 1402: Determine whether to carry custom button position settings of two modes, and if yes, perform step 1403, or otherwise, perform step 1404.

Step 1403: Determine whether there are virtual buttons with the same function and different shapes in the two modes, and if yes, perform step 1405, or otherwise, perform step 1404.

Step 1404: Customize the position of a virtual button according to an operation of a user.

Step 1405: Set a boundary area, and display a virtual button in a second mode in event that the virtual button is in the boundary area.

Step 1406: Customize positions of the virtual button in the two modes according to an operation of a user.

Step 1407: Write the customized position of the virtual button into custom configuration data.

In this manner, after entering the game, the custom configuration data may be loaded according to a selected mode, to present the virtual button according to the custom configuration data.

Embodiments of this application have the following beneficial effects:

In the same operation button adjustment interface, a user may adjust the similar or same functional button positions in a plurality of modes at the same time, which can improve the efficiency of human-computer interaction, reduce memory consumption during data processing, and save data storage space.

The following continues to describe an exemplary structure when the apparatus 555 for adjusting the position of a virtual button according to the embodiments of this application is implemented as a software module. In some embodiments, as shown in FIG. 4, the software module stored in the apparatus 555 for adjusting the position of a virtual button in a memory 550 may include:

a presentation module 5551, configured to present a button adjustment interface of a virtual scene including a target virtual button;

a movement module 5552, configured to control, in response to a movement operation for the target virtual button, the target virtual button to move in the button adjustment interface, to adjust a presentation position of the target virtual button in the virtual scene, there being at least two presentation forms of the target virtual button in the virtual scene; and a prompt module 5553, configured to present prompt information in event that the target virtual button is moved to a boundary area in the button adjustment interface, the prompt information being used for prompting that the target virtual button is displayed abnormally in the virtual scene in event that the target virtual button is in a target presentation form of the at least two presentation forms.

In some embodiments, the presentation module 5551 is further configured to: determine an initial presentation form of the target virtual button in the at least two presentation forms of the target virtual button; and present the button adjustment interface including the target virtual button in the initial presentation form.

In some embodiments, the prompt module 5553 is further configured to: switch the target virtual button from the initial presentation form to the target presentation form; and use the target virtual button in the target presentation form as the prompt information.

In some embodiments, the prompt module 5553 is further configured to: acquire a presentation position of the target virtual button in the initial presentation form in the boundary area;

present the target virtual button in the target presentation form at the presentation position, for the target virtual button in the initial presentation form and the target virtual button in the target presentation form to be presented in an overlapping manner; and use the target virtual button in the target presentation form as the prompt information.

In some embodiments, the presentation module 5551 is further configured to: receive a movement operation for the target virtual button in the initial presentation form;

control, in response to the movement operation, the target virtual button in the initial presentation form to move in the button adjustment interface, and control the target virtual button in the target presentation form to move synchronously along with the movement of the target virtual button in the initial presentation form.

In some embodiments, the prompt module 5553 is further configured to: present a prompt interface in the form of a floating window, for the floating window to float above the button adjustment interface, and display the prompt information in the floating window.

In some embodiments, the movement module 5552 is further configured to control, in evet that the movement operation is a drag operation, the target virtual button to move in the button adjustment interface following the drag operation.

In some embodiments, the movement module 5552 is further configured to: receive the selection operation for the target virtual button, and control the target virtual button to be in a pre-moving state;

receive the click operation triggered in the button adjustment interface; and determine a click position corresponding to the click operation, and control the target virtual button in the pre-moving state to move to the click position.

In some embodiments, the presentation module 5551 is further configured to present, in a process of controlling the target virtual button to move in the button adjustment interface, the boundary area in the button adjustment interface in a target presentation mode, to distinguish the boundary area from a non-boundary area in the button adjustment interface.

In some embodiments, the movement module 5552 is further configured to: acquire a target position of the target virtual button in event that the target virtual button stops moving in the button adjustment interface;

use, in response to a position determination instruction for the target position, the target position as the presentation position of the target virtual button in the virtual scene in event that the target virtual button is in a non-target presentation form;

determine, based on the target position, at least one candidate position that is in a non-boundary area and matches the target presentation form; and select a candidate position from the at least one candidate position as the presentation position of the target virtual button in the virtual scene in event that the target virtual button is in the target presentation form.

In some embodiments, the movement module 5552 is further configured to: acquire a target position of the target virtual button in event that the target virtual button stops moving in the button adjustment interface;

use, in response to a position determination instruction for the target position, the target position as the presentation position of the target virtual button in the virtual scene in event that the target virtual button is in a non-target presentation form;

present the target virtual button in the target presentation form in a non-boundary area in the button adjustment interface; and determine, based on the target virtual button in the target presentation form and in response to a position selection operation, a position indicated by the position selection operation as the presentation position of the target virtual button in the target presentation form in the virtual scene.

In some embodiments, the movement module 5552 is further configured to: acquire, in event that the target virtual button is moved to a non-boundary area in the button adjustment interface, a target position of the target virtual button in event that the target virtual button stops moving in the button adjustment interface; and use the target position as the presentation position of the target virtual button in the virtual scene in event that the target virtual button is in the at least two presentation forms.

An embodiment of this application provides a computer program product or a computer program. The computer program product or the computer program includes computer instructions, and the computer instructions are stored in a computer-readable storage medium. A processor of a computer device reads computer instructions from a computer-readable storage medium, and executes the computer instructions, to cause the computer device to perform the method for adjusting the position of a virtual button in the foregoing embodiments of this application.

An embodiment of this application provides a computer-readable storage medium, storing executable instructions, the executable instructions, when executed by a processor, causing the processor to perform the method provided in the embodiments of this application, for example, the method shown in FIG. 5.

In some embodiments, the computer-readable storage medium may be a ferroelectric random access memory (FRAM), a ROM, a programmable read-only memory (PROM), an erasable programmable read-only memory (EPROM), an electrically erasable programmable read-only memory (EEPROM), a flash memory, a magnetic surface memory, an optical disk, a CD-ROM or another memory; or may be a plurality of devices including one or any combination of the foregoing memories.

In some embodiments, the executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for adjusting the position of a virtual button, performed by a computer device, and comprising:
   presenting a button adjustment interface comprising a target virtual button in a first presentation form, wherein the target virtual button has at least two presentation forms;
   controlling, in response to a movement operation for the target virtual button, the target virtual button to move in the button adjustment interface, to adjust a presentation position of the target virtual button;
   presenting prompt information in response the target virtual button being moved to a boundary area outside of a non-boundary area in the button adjustment interface, the prompt information being used for prompting that the target virtual button is displayed abnormally at the adjusted presentation position when the target virtual button is in a second presentation form of the at least two presentation forms;
   determining a finalized presentation position of the target virtual button; and
   displaying a picture of a virtual scene with the target virtual button, wherein the target virtual button is displayed at the finalized presentation position of a screen of the computer device.

2. The method according to claim 1, wherein the presenting a button adjustment interface of a virtual scene comprising a target virtual button comprises:
   determining an initial presentation form of the target virtual button in the at least two presentation forms of the target virtual button; and
   presenting the button adjustment interface comprising the target virtual button in the initial presentation form.

3. The method according to claim 2, wherein the presenting prompt information comprises:
   switching the target virtual button from the initial presentation form to the target presentation form; and
   using the target virtual button in the target presentation form as the prompt information.

4. The method according to claim 2, wherein the presenting prompt information comprises:
   acquiring a presentation position of the target virtual button in the initial presentation form in the boundary area;
   presenting the target virtual button in the target presentation form at the presentation position, for the target virtual button in the initial presentation form and the target virtual button in the target presentation form to be presented in an overlapping manner; and
   using the target virtual button in the target presentation form as the prompt information.

5. The method according to claim 4, after the presenting prompt information, further comprising:
   receiving a movement operation for the target virtual button in the initial presentation form;
   controlling, in response to the movement operation, the target virtual button in the initial presentation form to move in the button adjustment interface, and
   controlling the target virtual button in the target presentation form to move synchronously along with the movement of the target virtual button in the initial presentation form.

6. The method according to claim 1, wherein the presenting prompt information comprises:
   presenting a prompt interface in the form of a floating window, for the floating window to float above the button adjustment interface, and
   displaying the prompt information in the floating window.

7. The method according to claim 1, wherein the movement operation comprises a drag operation, and the controlling the target virtual button to move in the button adjustment interface comprises:
   controlling the target virtual button to move in the button adjustment interface following the drag operation.

8. The method according to claim 1, wherein the movement operation comprises a selection operation and a click operation, and before the controlling the target virtual button to move in the button adjustment interface, the method further comprises:
   receiving the selection operation for the target virtual button, and controlling the target virtual button to be in a pre-moving state; and
   receiving the click operation triggered in the button adjustment interface; and
   the controlling the target virtual button to move in the button adjustment interface comprises:
   determining a click position corresponding to the click operation, and
   controlling the target virtual button in the pre-moving state to move to the click position.

9. The method according to claim 1, further comprising:
   presenting, in a process of controlling the target virtual button to move in the button adjustment interface, the boundary area in the button adjustment interface in a target presentation mode, to distinguish the boundary area from a non-boundary area in the button adjustment interface.

10. The method according to claim 1, further comprising:
    acquiring a target position of the target virtual button when the target virtual button stops moving in the button adjustment interface; and
    after the presenting prompt information:
    using, in response to a position determination instruction for the target position, the target position as the presentation position of the target virtual button in the virtual scene in response to the target virtual button being in a non-target presentation form;
    determining, based on the target position, at least one candidate position that is in a non-boundary area and matches the target presentation form; and
    selecting a candidate position from the at least one candidate position as the presentation position of the target virtual button in the virtual scene in response to the target virtual button being in the target presentation form.

11. The method according to claim 1, further comprising:
acquiring a target position of the target virtual button when the target virtual button stops moving in the button adjustment interface; and
after the presenting prompt information, the method further comprises:
using, in response to a position determination instruction for the target position, the target position as the presentation position of the target virtual button in the virtual scene in response to the target virtual button being in a non-target presentation form;
presenting the target virtual button in the target presentation form in a non-boundary area in the button adjustment interface; and
determining, based on the target virtual button in the target presentation form and in response to a position selection operation, a position indicated by the position selection operation as the presentation position of the target virtual button in the target presentation form in the virtual scene.

12. The method according to claim 1, further comprising:
in response to the target virtual button being moved to a non-boundary area in the button adjustment interface, acquiring a target position of the target virtual button when the target virtual button stops moving in the button adjustment interface; and
using the target position as the presentation position of the target virtual button in the virtual scene in response to the target virtual button being in any one of the at least two presentation forms.

13. An apparatus comprising:
a memory configured to store a plurality of executable instructions; and
a processor configured execute the plurality of executable instructions to:
present a button adjustment interface of a virtual scene comprising a target virtual button;
control, in response to a movement operation for the target virtual button, the target virtual button to move in the button adjustment interface, to adjust a presentation position of the target virtual button in the virtual scene, wherein at least two presentation forms of the target virtual button are in the virtual scene; and
present prompt information in response to the target virtual button being moved to a boundary area outside of a non-boundary area in the button adjustment interface, to prompt that the target virtual button is displayed abnormally in the virtual scene when the target virtual button is in a target presentation form of the at least two presentation forms.

14. The apparatus according to claim 13, wherein, in order to present the button adjustment interface of the virtual scene comprising the target virtual button, the processor is configured to execute the plurality or executable instructions to:
determine an initial presentation form of the target virtual button in the at least two presentation forms of the target virtual button; and
present the button adjustment interface comprising the target virtual button in the initial presentation form.

15. The apparatus according to claim 13, wherein, in order to present prompt information, the processor is configured to execute the plurality of executable instructions to:
present a prompt interface in the form of a floating window, for the floating window to float above the button adjustment interface, and
display the prompt information in the floating window.

16. The apparatus according to claim 13, wherein the movement operation comprises a drag operation, and wherein, in order to control the target virtual button to move in the button adjustment interface, the processor is configured to execute the plurality of executable instructions to:
control the target virtual button to move in the button adjustment interface following the drag operation.

17. A non-transitory computer-readable storage medium, storing a plurality of executable instructions that, when executed by a processor, are configured to cause the processor to:
present a button adjustment interface of a virtual scene comprising a target virtual button;
control, in response to a movement operation for the target virtual button, the target virtual button to move in the button adjustment interface, to adjust a presentation position of the target virtual button in the virtual scene, wherein at least two presentation forms of the target virtual button are in the virtual scene; and
present prompt information in response to the target virtual button being moved to a boundary area outside of a non-boundary area in the button adjustment interface, to prompt that the target virtual button is displayed abnormally in the virtual scene when the target virtual button is in a target presentation form of the at least two presentation forms.

18. The non-transitory computer-readable storage medium according to claim 17, wherein the movement operation comprises a selection operation and a click operation, and before the control of the target virtual button to move in the button adjustment interface, the plurality of instructions, when executed by the processor, cause the processor to:
receive the selection operation for the target virtual button, and control the target virtual button to be in a pre-moving state; and
receive the click operation triggered in the button adjustment interface; and
wherein in order to cause the processor to control the target virtual button to move in the button adjustment interface, the plurality of executable instructions, when executed by the processor, cause the processor to:
determine a click position corresponding to the click operation, and
control the target virtual button in the pre-moving state to move to the click position.

19. The non-transitory computer-readable storage medium according to claim 17, wherein the plurality of executable instructions, when executed by the processor, further cause the processor to:
present, in a process of controlling the target virtual button to move in the button adjustment interface, the boundary area in the button adjustment interface in a target presentation mode, to distinguish the boundary area from a non-boundary area in the button adjustment interface.

20. The non-transitory computer-readable storage medium according to claim 17, wherein the plurality of executable instructions, when executed by the processor, further cause the processor to:
acquire a target position of the target virtual button when the target virtual button stops moving in the button adjustment interface; and
after the presentation of the prompt information:
use, in response to a position determination instruction for the target position, the target position as the presentation position of the target virtual button in the virtual scene in response to the target virtual button being in a non-target presentation form;

determine, based on the target position, at least one candidate position that is in a non-boundary area and matches the target presentation form; and select a candidate position from the at least one candidate position as the presentation position of the target virtual button in the virtual scene in response to the target virtual button being in the target presentation form.

* * * * *